United States Patent [19]

Nakashima et al.

[11] Patent Number: 5,708,650
[45] Date of Patent: Jan. 13, 1998

[54] MULTIPLE FORMAT INTERCHANGEABLE OPTICAL RECORDING MEDIUM AND METHOD OF CONTROLLING SAME

[75] Inventors: Kazuo Nakashima; Kenichi Utsumi, both of Kawasaki, Japan

[73] Assignee: Fujitsu Limited, Kawasaki, Japan

[21] Appl. No.: 659,070

[22] Filed: Jun. 4, 1996

Related U.S. Application Data

[63] Continuation of Ser. No. 228,297, Apr. 15, 1994, abandoned.

[30] Foreign Application Priority Data

Aug. 26, 1993 [JP] Japan ................... 5-311296

[51] Int. Cl.$^6$ ........................... G11B 7/11
[52] U.S. Cl. ................. 369/275.3; 369/47; 369/54
[58] Field of Search ................... 369/32, 47, 48, 369/50, 54, 58, 100, 111, 133, 275.3, 275.1, 13

[56] References Cited

U.S. PATENT DOCUMENTS

| | | | |
|---|---|---|---|
| 4,800,550 | 1/1989 | Yamauchi | 369/47 |
| 4,967,403 | 10/1990 | Ogawa et al. | 369/275.3 |
| 5,166,921 | 11/1992 | Matsui | 369/275.3 |
| 5,214,627 | 5/1993 | Nakashima et al. | 369/32 |
| 5,323,380 | 6/1994 | Oda et al. | 369/47 |
| 5,345,435 | 9/1994 | Yamasaki | 369/275.3 |
| 5,349,577 | 9/1994 | Mikamo | 369/47 |
| 5,410,676 | 4/1995 | Huang et al. | 369/13 |
| 5,418,773 | 5/1995 | Bakx et al. | 369/275.3 |
| 5,422,871 | 6/1995 | Nakashima et al. | 369/47 |

FOREIGN PATENT DOCUMENTS 0167093  1/1986  European Pat. Off. .

OTHER PUBLICATIONS

"A Single Medium Enables Starting Of A Plurality Of Sytems", Nkkei Byte, Jan., 1992.

*Primary Examiner*—David C. Nelms
*Assistant Examiner*—Kim-Kwok Chu
*Attorney, Agent, or Firm*—Greer, Burns & Crain, Ltd.

[57] ABSTRACT

Common-use data (FATs, a directory, files, etc.) is recorded in a first area of an interchangeable recording medium, and logical format information of a plurality of types for managing the common-use data recorded in the first area is recorded in the second area. When the interchangeable recording medium is loaded, a computer reads logical format information conforming to its own machine type from the second area and subsequently accesses the common-use data in the first area based upon the logical format information read. Further, a corresponding relationship between computers and storage locations of the logical format information is recorded in a third area of the interchangeable recording medium. Each computer recognizes the location, at which its own logical format information has been stored, by referring to the corresponding relationship and reads the logical format information from this location. The computer subsequently accesses the common-use data in the first area based upon the logical format information read.

16 Claims, 24 Drawing Sheets

FIG. 5A

BPB TABLE OF COMPANY A (LBN 512)

| | |
|---|---|
| SECTOR SIZE | 2048 BYTES |
| CLUSTER LENGTH | 2 SECTORS |
| RESERVED SECTOR COUNT | 1 SECTOR |
| FAT COUNT | 2 |
| ROOT DIRECTORY ENTRY COUNT | 1024 |
| TOTAL SECTOR COUNT IN LOGICAL VOLUME | 61816 |
| MEDIA DESCRIPTOR | FA |
| SECTOR COUNT PER FAT | 32 SECTORS |

FIG. 5B

BPB TABLE OF COMPANY B (LBN 514)

| | |
|---|---|
| SECTOR SIZE | 1024 BYTES |
| CLUSTER LENGTH | 4 SECTORS |
| RESERVED SECTOR COUNT | 1 SECTOR |
| FAT COUNT | 2 |
| ROOT DIRECTORY ENTRY COUNT | 1024 |
| TOTAL SECTOR COUNT IN LOGICAL VOLUME | 123631 |
| MEDIA DESCRIPTOR | FA |
| SECTOR COUNT PER FAT | 64 SECTORS |

FIG. 5C

BPB TABLE OF COMPANY C (LBN 515)

| | |
|---|---|
| SECTOR SIZE | 512 BYTES |
| CLUSTER LENGTH | 8 SECTORS |
| RESERVED SECTOR COUNT | 1 SECTOR |
| FAT COUNT | 2 |
| ROOT DIRECTORY ENTRY COUNT | 1024 |
| TOTAL SECTOR COUNT IN LOGICAL VOLUME | 247261 |
| MEDIA DESCRIPTOR | FA |
| SECTOR COUNT PER FAT | 128 SECTORS |

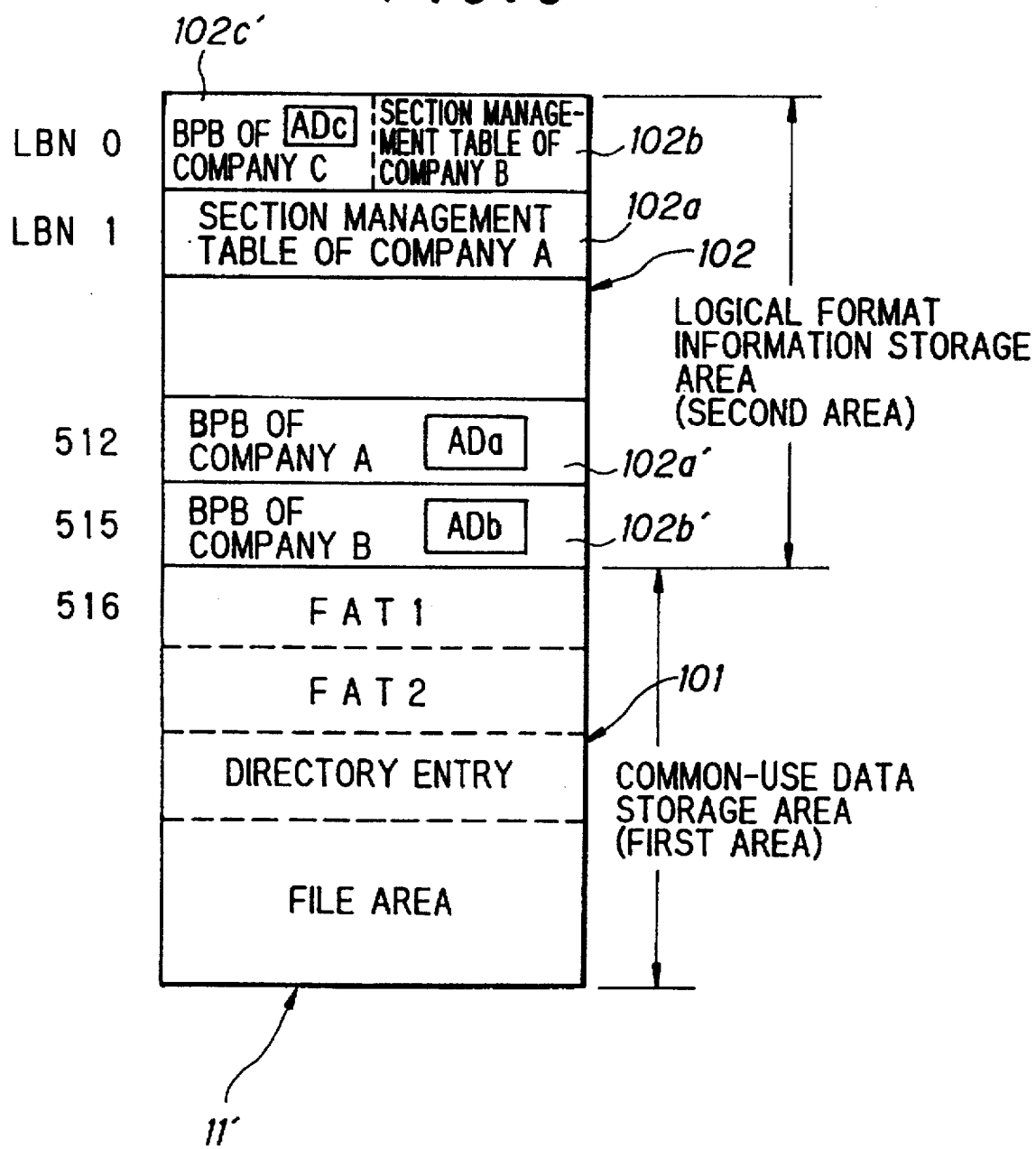

FIG. 7A

BPB TABLE OF COMPANY A (LBN 512)

| SECTOR SIZE | 2048 BYTES |
|---|---|
| CLUSTER LENGTH | 2 SECTORS |
| RESERVED SECTOR COUNT | 1 SECTOR |
| FAT COUNT | 2 |
| ROOT DIRECTORY ENTRY COUNT | 1024 |
| TOTAL SECTOR COUNT IN LOGICAL VOLUME | 61816 |
| MEDIA DESCRIPTOR | FA |
| SECTOR COUNT PER FAT | 32 SECTORS |

FIG. 7B

BPB TABLE OF COMPANY B (LBN 515)

| SECTOR SIZE | 512 BYTES |
|---|---|
| CLUSTER LENGTH | 8 SECTORS |
| RESERVED SECTOR COUNT | 1 SECTOR |
| FAT COUNT | 2 |
| ROOT DIRECTORY ENTRY COUNT | 1024 |
| TOTAL SECTOR COUNT IN LOGICAL VOLUME | 247261 |
| MEDIA DESCRIPTOR | FA |
| SECTOR COUNT PER FAT | 128 SECTORS |

FIG. 7C

BPB TABLE OF COMPANY C (LBN 0)

| SECTOR SIZE | 512 BYTES |
|---|---|
| CLUSTER LENGTH | 8 SECTORS |
| RESERVED SECTOR COUNT | 516 SECTORS |
| FAT COUNT | 2 |
| ROOT DIRECTORY ENTRY COUNT | 1024 |
| TOTAL SECTOR COUNT IN LOGICAL VOLUME | 247776 |
| MEDIA DESCRIPTOR | FA |
| SECTOR COUNT PER FAT | 128 SECTORS |

FIG. 9A
BPB TABLE OF COMPANY D (LBN 14)

| | |
|---|---|
| SECTOR SIZE | 512 BYTES |
| CLUSTER LENGTH | 8 SECTORS |
| RESERVED SECTOR COUNT | 25 SECTORS |
| FAT COUNT | 2 |
| ROOT DIRECTORY ENTRY COUNT | 1024 |
| TOTAL SECTOR COUNT IN LOGICAL VOLUME | 246304 |
| MEDIA DESCRIPTOR | FA |
| SECTOR COUNT PER FAT | 128 SECTORS |

~102d'

FIG. 9B
BPB TABLE OF COMPANY E (LBN 15)

| | |
|---|---|
| SECTOR SIZE | 2048 BYTES |
| CLUSTER LENGTH | 2 SECTORS |
| RESERVED SECTOR COUNT | 6 SECTORS |
| FAT COUNT | 2 |
| ROOT DIRECTORY ENTRY COUNT | 1024 |
| TOTAL SECTOR COUNT IN LOGICAL VOLUME | 61576 |
| MEDIA DESCRIPTOR | FA |
| SECTOR COUNT PER FAT | 32 SECTORS |

~102e'

FIG. 9C
BPB TABLE OF COMPANY F (LBN 17)

| | |
|---|---|
| SECTOR SIZE | 512 BYTES |
| CLUSTER LENGTH | 8 SECTORS |
| RESERVED SECTOR COUNT | 22 SECTORS |
| FAT COUNT | 2 |
| ROOT DIRECTORY ENTRY COUNT | 1024 |
| TOTAL SECTOR COUNT IN LOGICAL VOLUME | 246304 |
| MEDIA DESCRIPTOR | FA |
| SECTOR COUNT PER FAT | 128 SECTORS |

| NAME OF MACHINE TYPE | NAME OF LOGICAL FORMAT | LOCATION OF BPB TABLE |
|---|---|---|
| PERSONAL COMPUTER OF COMPANY D | FORMAT OF COMPANY D | LBN 14 |
| PERSONAL COMPUTER OF COMPANY E | FORMAT OF COMPANY E | LBN 15 |
| PERSONAL COMPUTER OF COMPANY F | FORMAT OF COMPANY F | LBN 17 |

FIG. 11

| FORMAT | FAT STARTING POSITION | STARTING POSITION OF ROOT DIRECTORY ENTRY | STARTING POSITION OF FILE AREA |
|---|---|---|---|
| COMPANY D | LBN 39 | LBN 295 = 39 + (2 * 128) | LBN 359 = 295 + 64 |
| COMPANY E | LBN 39 | LBN 295 = 39 + (2 * 128) | LBN 359 = 295 + 64 |
| COMPANY F | LBN 39 | LBN 295 = 39 + (2 * 128) | LBN 359 = 295 + 64 |

FIG. 16

| NAME OF MACHINE TYPE | NAME OF LOGICAL FORMAT | LOCATION OF SECTION MANAGEMENT TABLE |
|---|---|---|
| PERSONAL COMPUTER OF COMPANY D | FORMAT OF COMPANY D | LBN 11 |
| PERSONAL COMPUTER OF COMPANY E | FORMAT OF COMPANY E | LBN 12 |
| PERSONAL COMPUTER OF COMPANY F | FORMAT OF COMPANY F | LBN 13 |

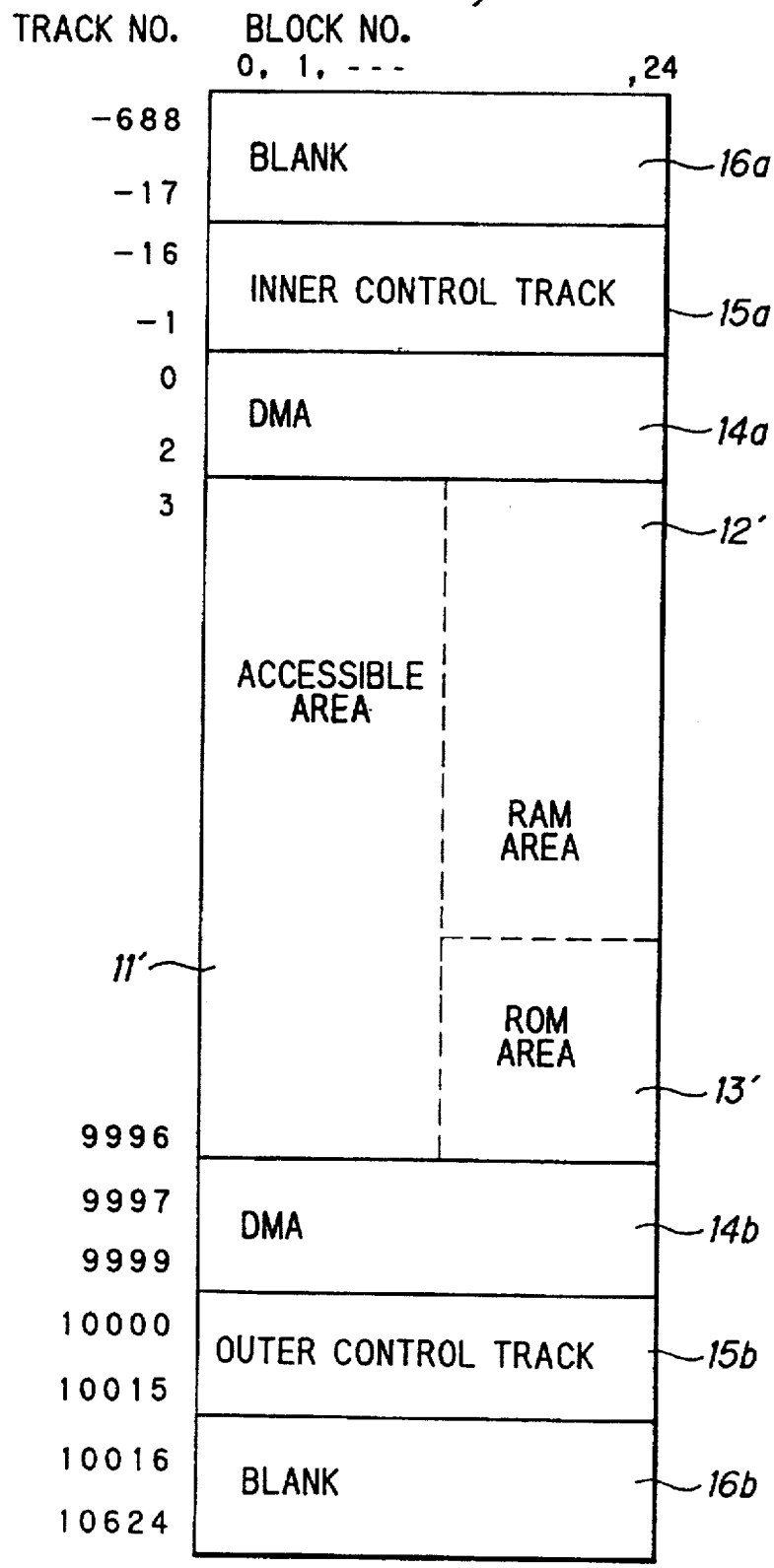

DISK OF COMPANY A

DISK OF COMPANY B

DISK OF COMPANY C

MULTIPLE FORMAT INTERCHANGEABLE OPTICAL RECORDING MEDIUM AND METHOD OF CONTROLLING SAME

This application is a continuation of application Ser. No. 08/228,297 filed Apr. 15, 1994, now abandoned on Aug. 8, 1996.

BACKGROUND OF THE INVENTION

This invention relates to an interchangeable recording medium and a method of controlling the same. More particularly, the invention relates to an interchangeable recording medium that supports a plurality of logical formats, as well as to method of controlling the recording medium.

In an optical disk, laser light is narrowed down to a very small beam spot having a diameter of about 1 μm to perform recording and playback of information signals. This is advantageous in that recording density is high and memory cost low on a per-bit basis. Moreover, high-speed access is possible and recording/playback can be carried out in a contactless manner. Such optical disks have been put into practical use as high-density large-capacity memories. Such optical disks can be classified broadly into optical disks (ROM disks) on which information is stored in advance and only reproduction is possible, optical disks (RAM disks) that allow information to be both recorded and reproduced, and partial-ROM disks in which a single optical disk has both of the above-mentioned features.

As shown in FIG. 17A, a ROM disk is such that information is recorded as pits 2 in a transparent plastic layer 1, a metal film (e.g., aluminum) 3 is formed on the pit surface as by vapor deposition, and a protective layer 4 is provided on the metal film 3. In a ROM disk of this kind, the signal layer (the pits and metal film) is irradiated with a laser beam LB via an objective lens OL, as illustrated in FIG. 17B. When this is done, almost all of the light returns intact from locations devoid of pits, whereas the light is refracted by pits at locations where the pits are present. Only some of the returned light actually returns to the objective lens OL since part of the light falls outside the visual field of the objective lens. Accordingly, the information can be read by using a photodiode to detect the returning light. Thus, with a ROM disk, information is recorded in the form of pits. This is advantageous in that the information is less likely to be damaged in comparison with magnetic recording, and a large quantity of information can readily be produced on a large number of disks by stamping. Such an optical disk is effective as a storage medium for electronic publishing. A shortcoming, however, is that it is not possible for the user to write information such as text on the ROM disk himself.

A RAM disk (magneto-optical disk) comprises a substrate and an amorphous, magnetic thin film such as TbFeCo deposited on the substrate. Such a disk utilizes a property according to which the retentiveness necessary for magnetic reversal of the magnetic film diminishes in conformity with a rise in temperature (retentiveness is zero at the Curie point). More specifically, recording and erasure are performed by irradiating the disk with a laser beam to raise the temperature of the disk medium to the vicinity of 200°C., thereby weakening retentiveness, applying a weak magnetic field under this condition and controlling the direction of magnetization. Accordingly, as illustrated in FIG. 18A, an upwardly directed magnetic field is applied by a writing coil 6 under a condition in which the direction of magnetization of a magnetic film 5 is pointed downward. When a portion at which the direction of magnetization is desired to be changed is irradiated with a laser beam LB via an objective lens OL, as shown in FIG. 18B, the direction of magnetization of this portion reverses, i.e., is pointed upward. This makes it possible to record information. When information is read, the magnetic film 5 is irradiated with a laser beam LB having a plane of polarization along the y axis, as illustrated in FIG. 18C. When this is done, reflected light LBO, in which the plane of polarization has been rotated by $\theta_k$ in the clockwise direction owing to the magnetic Kerr effect, is obtained in the portion where magnetization is downwardly directed. In the portion where magnetization is upwardly directed, reflected light LB1, in which the plane of polarization has been rotated by $\theta_k$ in the counter-clockwise direction owing to the magnetic Kerr effect, is obtained. Accordingly, the direction of magnetization, namely information, can be read by detecting the state of polarization of reflected light.

Since a RAM disk can thus be rewritten, a user is capable of writing information such as text at will, unlike the case with a ROM disk. With a RAM disk, therefore, fixed information such as a system program and character fonts is recorded in a prescribed area of the disk, this area is made a write-inhibit area and other areas can be used as areas for recording user-created text, additional information and version upgrading information. However, a RAM disk requires that the fixed information be written thermomagnetically item by item. As a consequence, fabrication takes time and raises cost.

A partial ROM (a partial-ROM magneto-optical disk) has a ROM area whose structure is identical with that of a ROM disk, and a RAM area whose structure is identical with that of a RAM disk. As a result, fixed information such as a system program and character fonts can be recorded in the ROM area by stamping, thus eliminating the need to write the information item by item. In addition, the user is capable of writing text in the RAM area at will. In other words, a partial ROM is ideal for applications in which there is a need for an area (a ROM area) that stores fixed information as well as a rewritable area (a RAM area) on one and the same disk.

In accordance with ISO specifications, a 3.5-inch optical disk has about 10,000 tracks per side, in which the tracks are concentric circles or spiral in form. All of the tracks are divided into 25 sectors (25 blocks). FIG. 19 is a diagram for describing the constitution of an optical disk based upon the International Standards Organization (ISO). To simplify the description, part of the disk is cut open, block (sector) numbers (0–24) are taken along the horizontal direction and track numbers are shown along the vertical direction.

The area from Track 3 to Track 9996 is an accessible area (user-data zone) 11' capable of being accessed by the user through an ordinary method. The accessible area 11' can be one in which ① the entire area is a RAM portion 12' (full RAM disk), ② the entire area is a ROM portion 13' (full ROM disk) and ③ the inner side is the RAM portion 12' and the outer side is the ROM portion 13' (partial ROM disk). The three tracks on the inner side and the three tracks on the outer side of the accessible area 11' are provided respectively with defect management areas (DMA) 14a, 14b. The inner and outer circumferential portions are provided with an inner control track (referred to as an inner control zone) 15a, an outer control track (referred to as an outer control zone) 15b, and blank areas 16a, 16b. The defect management area DMA is an area for managing error information and substitute sectors, etc., when a defective sector occurs in the accessible area 11'.

As shown in FIG. 20, the accessible area 11' is provided at its head with an area $11_1$ for a section management table, and with n-number of section areas (first through n-th sections) $11_{21}$~$11_{2n}$ that follow the section $11_1$. The area $11_1$ for the section management table is one in which information (section information) relating to each section is written. FIG. 20 illustrates a case in which the accessible area 11' is divided into n-number of sections (first through n-th sections). First through n-th items of section information $11_{11}$~$11_{1n}$ are written in the section table area $11_1$. Recorded in each of the items of section information $11_{11}$~$11_{1n}$ are ① a starting sector of a section, ② the end sector of the section, ③ the sector count of the section, ④ the format (e.g., DOS, UNIX, CD-ROM logical format, etc.) within the section, and ⑤ a write-protect flag indicating whether rewriting is forbidden or not. Further, as will be set forth later, a BPB (BIOS parameter block) table is stored at the head of a section. The starting sector, therefore, indicates the position of the BPB.

The sections will now be described taking a DOS section as an example. As shown in FIG. 21, each of the section areas $11_{21}$~$11_{2n}$ is provided with (1) a reserved sector 17a that includes the BPB (BIOS parameter block) table, which describes information necessary for file management within a section, (2) a file management area 17b storing a file allocation table (FAT) and a directory, and (3) a file area 17c for storing various files.

The BPB table is provided at the beginning of the section and describes the volume structure parameters of the disk. The contents of the table 17a are standardized according to ISO 9293. Described in the BPB table are sector size (number of bytes per sector) SS, cluster length (sector count per cluster) SC, count FN (=2) of FATs, count RDE of entries in a root directory, total count TS of sectors within a logical volume, count SF of sectors per FAT, and count SPT of sectors per track.

The file management area 17b is provided with FAT entry portions 17b-1, 17b-2 and a directory entry 17b-3. Redundant first and second FATs (file allocation tables) are recorded in each of the FAT entry portions 17b-1, 17b-2. More specifically, each FAT entry portion has FAT entries the number of which is equivalent to the number of clusters in the section. The FAT entries take on values of 0000, 0002~MAX, FFF7, FFFF, respectively, in which 0000 means that the cluster is not in use. Further, 0002~MAX mean that the cluster is in use, with the next storage location of a file being designated by the particular value. Further, FFF7 means that there is a defect in the sector constituting the cluster, and FFFF signifies end of file.

Each directory entry in the directory 17b-3 consists of 32 bytes and, as shown in FIG. 22, has a space 18a for a file name, a space 18b for a file name extension, a space 18c for an attribute indication, a space 18d for a reserved field, a space 18e for file modification time, a space 18f for a file modification date, a space 18g for a starting cluster number of a file, and a space 18h for file length.

FIG. 23 is a diagram for describing directory entries, which indicates the storage location of a file name "FILE", as well as FAT entries. It is assumed here that a file named "FILE" has been stored at cluster numbers $0004_H$→$0005_H$→$0006_H$→$000A_H$. The starting cluster number "0004" of a file is stored at a directory entry in correlation with the file name "FILE". A cluster number "0005" indicating the next storage location of a file is stored at the FAT entry of cluster number 0004, a cluster number "0006" indicating the next storage location of a file is stored at the FAT entry of cluster number 0005, a cluster number "000A" indicating the final storage location of a file is stored at the FAT entry of cluster number 0006, and a cluster number "FFFF" indicating end of file is stored at the FAT entry of cluster number 000A.

FIG. 24 is a diagram for describing file access of a personal computer using an optical disk and the recording medium. When the optical disk is inserted into the disk drive, the system reads the section management table $11_1$ automatically and ascertains the position of the section (e.g., the first section $11_{21}$). Next, the system reads the BPB table stored at the beginning (reserved sector 17a) of the section, ascertains the FAT position and entry position by referring to the BPB table and accesses the file of the file area 17c using the FAT and directory. Further, when access to a file in another section is designated during operation of the system, the host system ascertains the starting position of this section by referring to the section management table $11_1$. Then, in a manner similar to that described above, the host system reads the BPB table, which has been recorded at the beginning of the section, and accesses the file of the designated section by referring to the BPB table.

In case of a large-capacity interchangeable recording medium such as an optical disk, it would be desirable if the data contained in this recording medium could be handled by a wide variety of personal computers. This could lead to a method of use in which consultative data created at one's office using a personal computer manufactured by Company A is recorded on an optical disk, the disk is taken home and the recorded data is edited at home using a personal computer manufactured by Company B. If this method of use could be made possible, then one would only need to carry about the optical disk and could make use of the recorded data anywhere. This would be very convenient.

However, in the present state of the art, data that has been recorded on an optical disk cannot be utilized on personal computers manufactured by different companies. The reason for this is that the logical format for handling an optical disk differs depending upon the manufacturer of the personal computer and the particular model of the personal computer. Moreover, the position at which the section management table is recorded also differs depending upon the company and machine model. Consequently, data in a portion formatted by the personal computer of Company A cannot be handled by the personal computer of Company B.

FIG. 25 is a diagram for describing the logical formats of various companies. In FIG. 25, LBN is the abbreviation of "logical block number" and signifies a logical block address. One logical block consists of 512 bytes.

In the logical format of a Company A, LBN 1 has the section management table $11_{1a}$, in which the starting position of each section and the size of each section, etc., are described (FIG. 25A). A BPB table is recorded in the beginning block of each of the sections $11_{21a}$, $11_{22a}$. When the disk is inserted in the personal computer manufactured by Company A, the latter reads LBN 1 automatically and recognizes the starting position of the section (namely the position of the BPB table), the size of the section, etc.

In the logical format of a Company B, LBN 0 has the section management table $11_{1b}$, in which the starting position of each section and the size of each section, etc., are described (FIG. 25B). A BPB table is recorded in the beginning block of each of the sections $11_{21b}$, $11_{22b}$. When the disk is inserted in the personal computer manufactured by Company A, the latter reads LBN 0 automatically and recognizes the starting position of the section, the size of the section, etc.

In the logical format of a Company C, there is no section management table and the section starts from the LBN 0 (FIG. 25C). The BPB table is located in the starting block of the section, namely at LBN 0. When the disk is inserted in the personal computer manufactured by Company C, the latter reads LBN 0 automatically and recognizes the size of the section, etc.

The personal computer of Company A handles the optical disk in accordance with the logical format (section management table, BPB information) of Company A and regards the section management table as residing at LBN 1. When the disk formatted according to the logical format of Company B is inserted in the disk drive of the personal computer of Company A, therefore, the latter reads the information that has been recorded at LBN 1 of this optical disk. However, since the section management table has not been written at LBN 1, data cannot be read or written from the optical disk having the logical format of Company B. The same difficulty arises if the optical disk formatted according to the logical format of Company A is inserted in the disk drive of the personal computer of Company B.

Thus, since the location of the BPB table or section management table differs depending upon the manufacturing company or model, one optical disk cannot be used by personal computers of a plurality of types and data recorded on an optical disk cannot be shared by personal computers of a plurality of types.

SUMMARY OF THE INVENTION

Accordingly, an object of the present invention is to provide an interchangeable recording medium capable of being used by a plurality of machine types, as well as a method of controlling this recording medium.

Another object of the present invention is to provide an interchangeable recording medium that allows recorded data to be utilized by a plurality of machine types, as well as a method of controlling this recording medium.

In accordance with the present invention, the foregoing objects are attained by providing an interchangeable recording medium having a first area in which data containing at least a file is recorded, and a second area in which logical format information for managing the data recorded in the first area is recorded, wherein items of logical format information of various computer devices are recorded in the second area.

Further, according to the present invention, the foregoing objects are attained by providing a method of controlling an interchangeable recording medium having a first area in which data containing at least a file is recorded, and a second area in which logical format information for managing the data recorded in the first area is recorded, the method comprising steps of recording logical format information of various computer devices in the second area, causing a computer device in which the interchangeable recording medium has been loaded to read the logical format information conforming to this computer device from the second area, and causing the computer device to access data in the first area based upon the logical format that has been read.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A, 5B and 5C are diagrams for describing the BPB tables of various companies according to the first embodiment;

FIG. 6 is a diagram for describing a modification of the first embodiment;

FIGS. 7A, 7B and 7C are diagrams for describing the BPB tables of various companies in the modification;

FIGS. 9A, 9B and 9C are diagrams for describing the BPB tables of various companies according to the second embodiment;

FIG. 10 is a diagram for describing a correspondence table showing the correspondence between machine types and logical formats;

FIG. 11 is a diagram for describing position information in each of various formats;

FIG. 16 is a diagram for describing a correspondence table showing the correspondence between machine types and logical formats;

FIG. 19 is a diagram for describing the constitution of an optical disk;

DESCRIPTION OF THE PREFERRED EMBODIMENTS (a) Description of general features of the invention

In FIGS. 1A and 1B, numeral 11 denotes an interchangeable recording medium such as an optical disk, 101 a first area for recording at least a file, and 102 a second area for recording plural items of logical format information for managing data (a FAT, directory, file) that has been recorded in the first area. Numeral $102_1$ denotes first logical format information, $102_2$ second logical format information, ... and $102n$ n-th logical format information. Further, $AD_1$~$AD_n$ represent items of address information (reserved sector count, sector length, etc.) needed in order to access data in the first area 101. In FIG. 1B, numeral 103 denotes a third area for recording the corresponding relationship between the machine types of computers and the locations at which logical format information is stored, and numeral 104 designates a fourth area storing a machine-type recognition program for recognizing the machine type of a computer device.

As shown in FIG. 1A, logical format information $102_1$~$102_n$ of a plurality of types for managing data (a FAT, directory or file) recorded in the first area 101 is recorded in the second area 102 of the interchangeable recording medium 11. When the interchangeable recording medium is loaded, the computer device (personal computer) reads the logical format information, which conforms to its own machine type, from the second area 102 and then accesses the data in the first area 101 on the basis of the logical format that has been read. In this case, the items of logical format information $102_1$~$102_n$ contain respective items of the address information (reserved sector count, sector length) $AD_1$~$AD_n$ needed in order to access the data in the first area 101, and each computer device access the data of the first area using this address information. If this arrangement is adopted, one interchangeable recording medium is capable of being used by computers of a plurality of types and data that has been recorded on the interchangeable recording medium can be utilized by computers of a plurality of types.

Figure 1A:
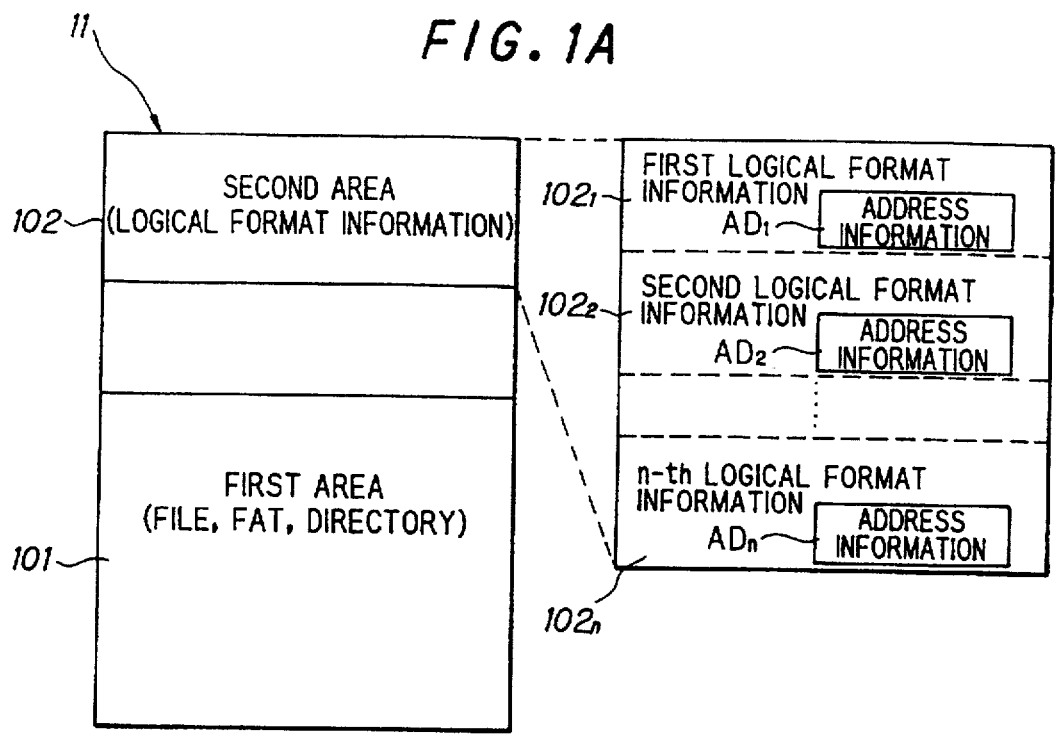
FIGS. 1A and 1B are diagrams for describing the general features of the present invention.
Figure 1B:
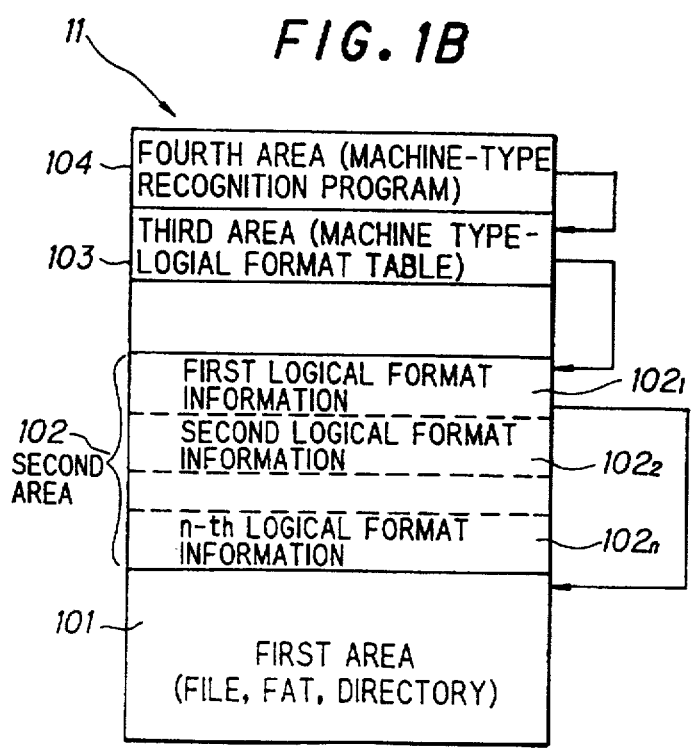

Further, as shown in FIG. 1B, logical format information $102_1$~$102_n$ of a plurality of types for managing data (a FAT, directory or file) recorded in the first area 101 is recorded in the second area 102 of the interchangeable recording medium 11, and the corresponding relationship between the types of computers and the locations at which logical format information is stored is recorded in the third area 103 of the interchangeable recording medium. Each computer devices refers to the corresponding relationship to recognize the location at which its own logical format information has been stored, reads the logical format information from this location and accesses the data in the first section 101 based upon the logical format read. In this case, if a machine-type recognition program for identifying the type of computer device is recorded in the fourth area 104 of the interchangeable recording medium 11 in advance, then the computer device will recognize its own machine type from the machine-type recognition program, obtain, from the corresponding relationship, the location at which the logical format information conforming to the recognized machine type has been recorded, read the logical format information from this location and access the data in the first area 101 based upon the logical format information read. If this arrangement is adopted, one interchangeable recording medium is capable of being used by computers of a plurality of types and data that has been recorded on the interchangeable recording medium can be utilized by computers of a plurality of types.

(b) System configuration of the invention

Figure 2:
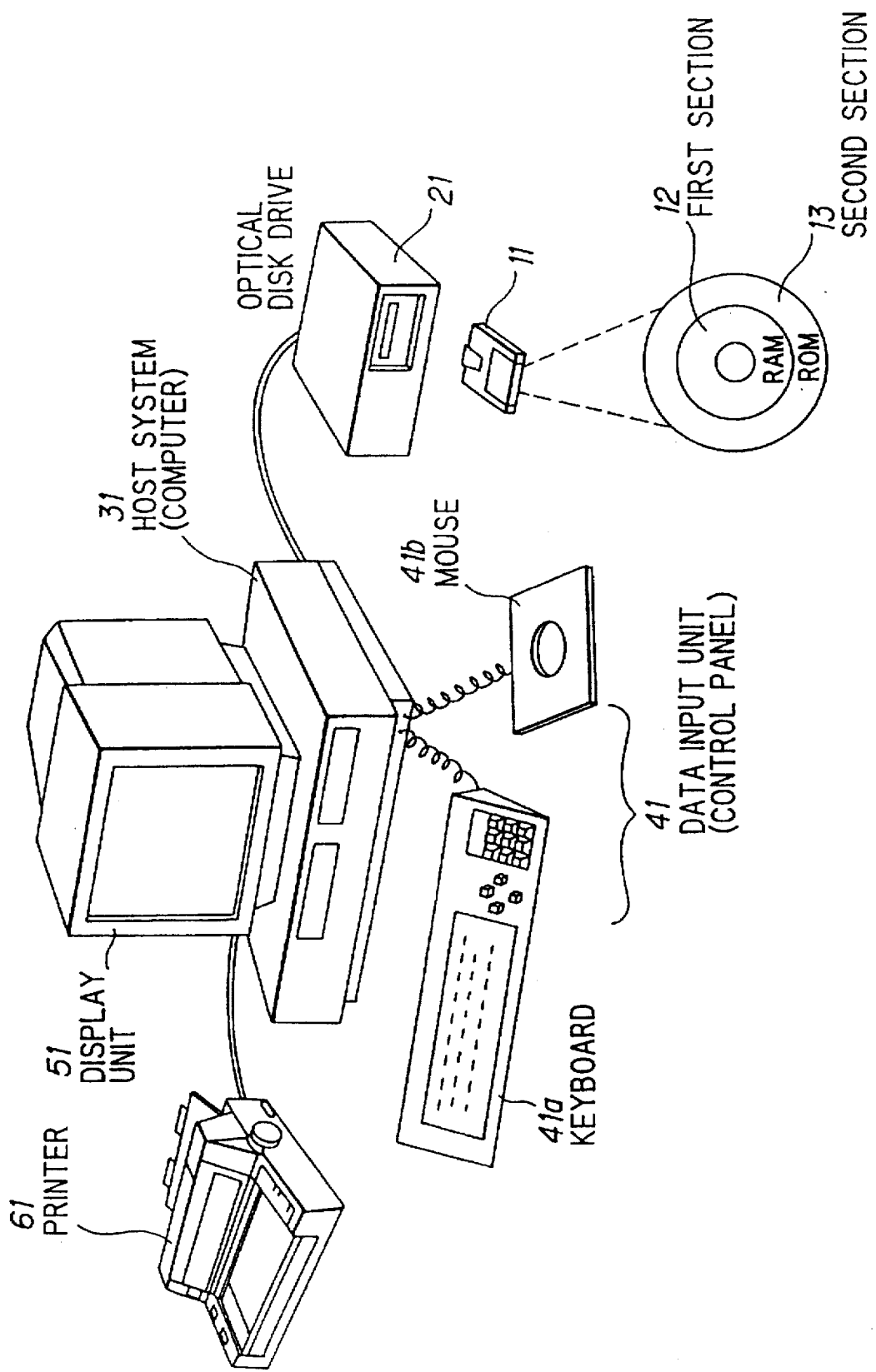
FIG. 2 is a diagram showing the system configuration.

FIG. 2 is diagram illustrating the configuration of a system using an optical disk as a recording medium. The system includes the optical disk 11 (a partial ROM, for example), an optical disk drive 21, a host system 31 (the main body of a computer), and a data input unit (control panel) 41, which has a keyboard 41a and a mouse 41b. Numeral 51 denotes a display unit such as a CRT or liquid-crystal display, and 61 represents a printer. A hard disk drive and a floppy disk device are provided as needed. The optical disk 11 has a plurality of sections, such as a section (first section) 12 provided in a rewritable RAM area and a section (second section) 13 provided in the ROM area exclusively for playback.

Figure 3:
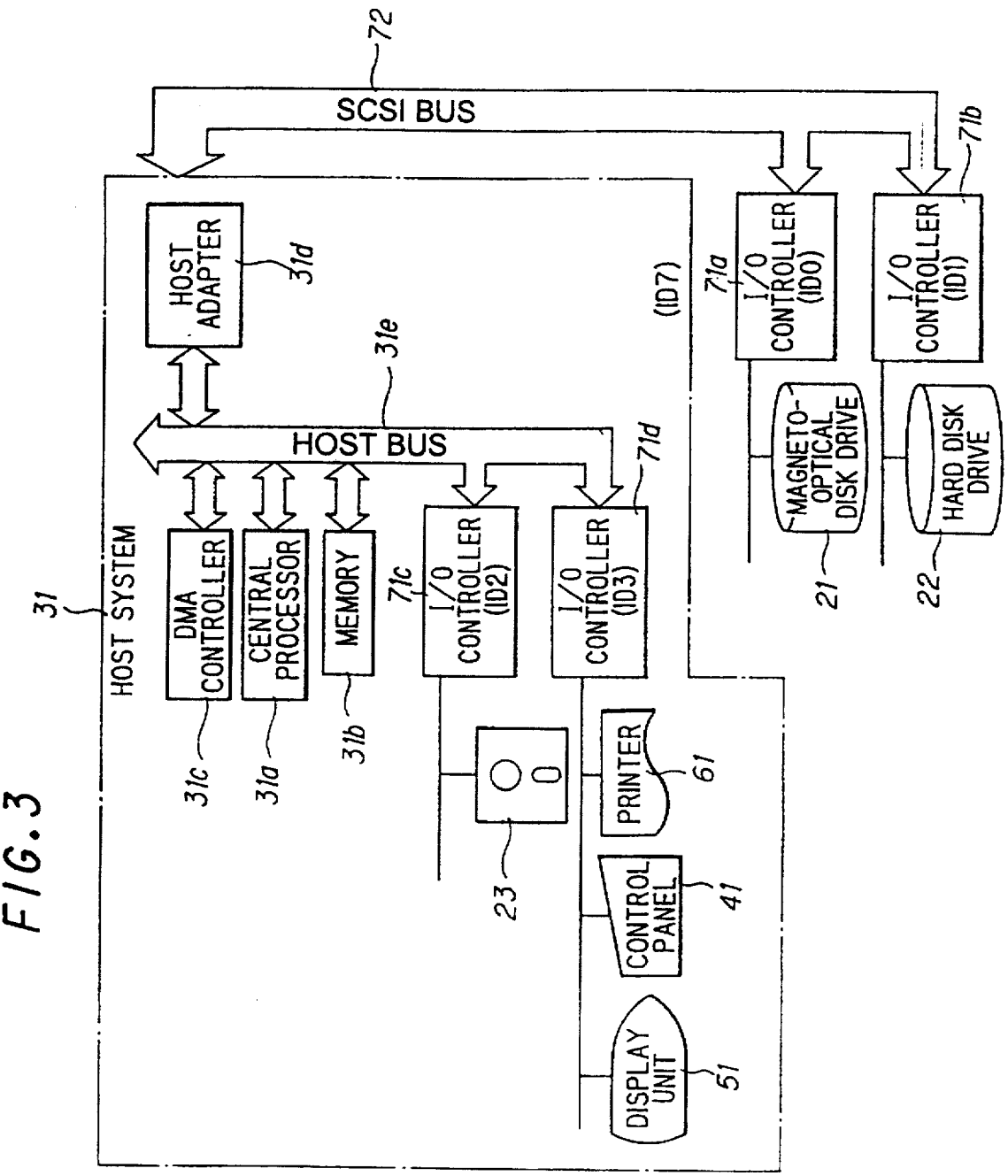
FIG. 3 is a block diagram showing the electrical configuration of the system.

FIG. 3 is a diagram showing the electrical configuration of the system, in which portions identical with those shown in FIG. 2 are designated by like reference characters. Numeral 21 denotes the optical disk drive, 22 a hard disk drive, 31 the host system, 71a~71b I/O controllers and 72 an SCSI (small computer system interface) bus. An SCSI is an interface that connects the main body of a computer with an external storage device. The specifications of an SCSI are stipulated by the American National Standard Institute (ANSI). The SCSI bus 72 is composed of a data bus, which comprises eight bits and a parity bit, and nine control busses, by way of example. Up to a maximum of eight SCSI devices (a host computer, a disk drive controller, etc.) can be connected to the SCSI bus, and each device connected has an identification number, referred to as an "ID" (identifier), of from 0 to 7. In FIG. 3, identifiers ID0~ID1 are allocated to the I/O controllers 71a, 71b, respectively, and ID7 is allocated to the host computer 31. Though the optical disk drive 21 and hard disk drive 22 are connected to the I/O controllers 71a, 71b, more than two drives can be connected.

The host system 31 includes a central processor 31a, a memory 31b, a DMA controller 31c, a host adapter 31d and I/O controllers 71c, 71d, all of which are connected to a host bus 31e. The host system 31 uses a floppy disk drive 23, which is connected to the I/O controller 71c. The host system further includes the control panel 41, the display device 51 and the printer 61, all of which are connected to an I/O controller 71d.

The host system 31 and the I/O controllers 71a, 71b are interconnected by an SCSI interface, and the I/O controllers 71a, 71b are connected to the respective drives 21, 22 by ESDIs (enhanced small device interfaces), by way of example. In this system the optical disk drive 21 and the hard disk drive 22 are separated from the host bus 31e, the SCSI bus 72 is provided separately of the host bus, the I/O controllers 71a, 71b for the drives are connected to this SCSI bus and the drives 21, 22 are controlled by the I/O controllers 71a, 71b, respectively, to lighten the burden upon the host bus.

(c) First embodiment of optical disk (c-1) Constitution

Figure 4:
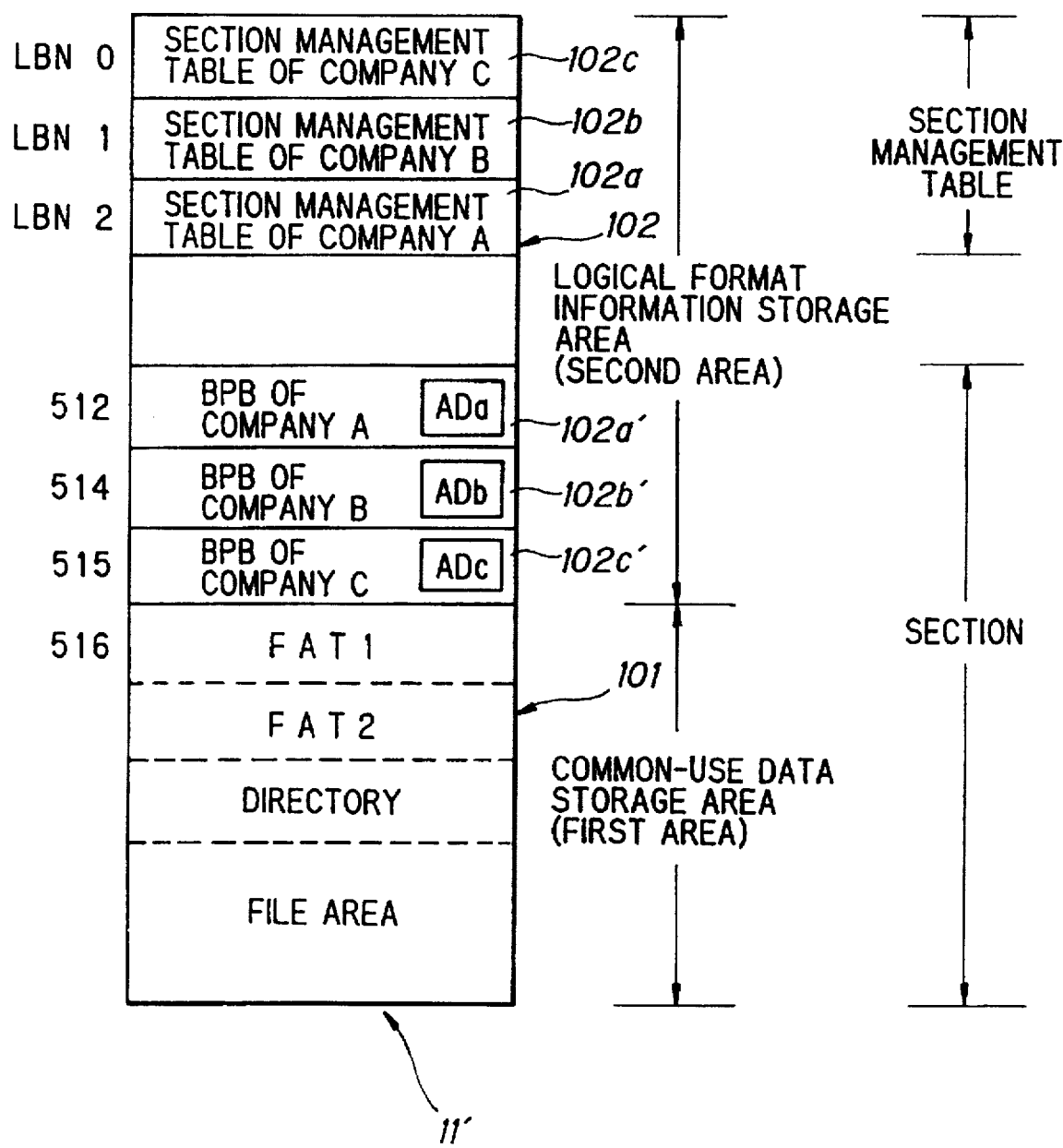
FIG. 4 is a diagram showing the constitution of an optical disk according to a first embodiment of the present invention.

FIG. 4 is a diagram showing the constitution of an accessible area in the optical disk, which is an interchangeable recording medium. Though only one section is illustrated a plurality of sections can be provided.

Numeral 11' denotes the accessible area of the optical disk, 101 the area (first area) for storing common-use data (FATs, a directory, a file) capable of being accessed by personal computers manufactured by various companies, and 102 the second section storing plural items of logical format information for managing data that has been recorded in the first area.

A section management table 102a of Company A is provided at LBN 2 of the second area 102 so as to correspond to a personal computer manufactured by Company A. Position information (LBN=512) of a BPB table 102a' is entered in the section management table 102a. The BPB table 102a' contains address information (reserved sector count, sector length) ADa, which indicates the starting position (LBN=516) of the first section 101.

More specifically, the following information shown in FIG. 5A is described in the BPB table 102a':

sector size SS=2048 bytes cluster length SC=two sectors reserved sector count RS=one sector FAT count FN=2 entry count RDE of root director=1024 total sector count TS in logical volume=61816 media descriptor=FA sector count per FAT=32 sectors

When the address information (reserved sector count, sector length) is used, the starting position of the first area 101 (the starting position of the first FAT) is obtained by the following formula:

$$\text{FAT starting position} = \text{BPB table position} + \text{reserved sector count} \cdot \frac{\text{sector length}}{512} \quad (1)$$

It should be noted that 512 is the number of bytes in the logical block. Accordingly, if sector length=2048, reserved sector count=1 are substituted into Equation (1), FAT starting position=516 will be obtained.

A section management table 102b of Company B is provided at LBN 1 of the second section 102 so as to correspond to a personal computer manufactured by Company B. Position information (LBN=514) of a BPB table 102b' is entered in the section management table 102b. The BPB table 102b' contains address information (reserved sector count, sector length) ADb, which indicates the starting position (LBN=516) of the first section 101.

More specifically, the following information shown in FIG. 5B is described in the BPB table 102b':

sector size SS=1024 bytes cluster length SC=four sectors reserved sector count RS=one sector FAT count FN=2 entry count RDE of root director=1024 total sector count TS in logical volumes=123631 media descriptor=FA sector count per FAT=64 sectors

When the address information (reserved sector count, sector length) is used, the starting position of the first area 101 (the starting position of the first FAT) is obtained from Equation (1). That is, FAT starting position=516 is obtained.

A section management table 102c of Company C is provided at LBN 0 of the second section 102 so as to correspond to a personal computer manufactured by Company C. Position information (LBN=515) of a BPB table 102c' is entered in the section management table 102c. The BPB table 102c' contains address information (reserved sector count, sector length) ADc, which indicates the starting position (LBN =516) of the first section 101.

More specifically, the following information shown in FIG. 5C is described in the BPB table 102c':

sector size SS=512 bytes cluster length SC=eight sectors reserved sector count RS=one sector FAT count FN=2 entry count RDE of root director=1024 total sector count TS in logical volume=247261 media descriptor=FA sector count per FAT=128 sectors

When the address information (reserved sector count, sector length) is used, the starting position of the first area 101 (the starting position of the first FAT) is obtained from Equation (1). That is, FAT starting position=516 is obtained.

The section management tables 102a–102c of the respective personal computers are recorded beforehand at a position (already known) that will be read in first by each personal computer when the disk is loaded.

(c-2) File access control

When the personal computer manufactured by each company reads a file, the computer accesses the file in the following manner:

① In case of the personal computer manufactured by Company A

When the optical disk is inserted in the optical disk drive 21 (FIGS. 2, 3) manufactured by Company A, the host system 31 of this personal computer recognizes that the section management table resides at LBN 2 and therefore reads the section management table 102a from LBN 2 automatically.

Since the position (LBN 512) of the BPB table of Company A has been entered in the section management table 102a, the host system reads the BPB table 102a' of Company A from LBN 512. Next, the host system recognizes that the first area 101 starts from LBN 516 based upon the address information (reserved sector count, sector length) ADa contained in the BPB table 102a'. Thereafter, the host system reads the file designated by the FAT information and directory information out of the first area or writes the designated file in the first area. If file access of another section is designated during system operation, the host system refers to the section management information 102a to ascertain the position of the BPB table of this section and refers to this BPB table to access the file of the designated section.

② In case of the personal computer manufactured by Company B

When the optical disk is inserted in the optical disk drive 21 (FIGS. 2, 3) manufactured by Company B, the host system 31 of this personal computer recognizes that the section management table resides at LBN 1 and therefore reads the section management table 102b from LBN 1 automatically.

Since the position (LBN 514) of the BPB table of Company B has been entered in the section management table 102b, the host system reads the BPB table 102b' of Company B from LBN 514. Next, the host system recognizes that the first area 101 starts from LBN 516 based upon the address information (reserved sector count, sector length) ADb contained in the BPB table 102b'. Thereafter, the host system reads the file designated by the FAT information and directory information out of the first area or writes the designated file in the first area. If file access of another section is designated during system operation, the host system refers to the section management information 102b to ascertain the position of the BPB table of this section and refers to this BPB table to access the file of the designated section.

③ In case of the personal computer manufactured by Company C

When the optical disk is inserted in the optical disk drive 21 (FIGS. 2, 3) manufactured by Company C, the host system 31 of this personal computer recognizes that the section management table resides at LBN 0 and therefore reads the section management table 102c from LBN 0 automatically.

Since the position (LBN 515) of the BPB table of Company C has been entered in the section management table 102c, the host system reads the BPB table 102c' of Company C from LBN 515. Next, the host system recognizes that the first area 101 starts from LBN 516 based upon the address information (reserved sector count, sector length) ADc contained in the BPB table 102c'. Thereafter, the host system reads the file designated by the FAT information and directory information out of the first area or writes the designated file in the first area. If file access of another section is designated during system operation, the host system refers to the section management information 102c to ascertain the position of the BPB table of this section and refers to this BPB table to access the file of the designated section.

If the arrangement described above is adopted, one and the same optical disk can be shared by computer devices of a plurality of types. Moreover, data stored on the optical disk can be utilized commonly by computer devices of a plurality of types.

(c-3) Modification

In FIG. 4, a case is illustrated in which the section management tables 102a, 102b, 102c are provided to correspond to respective ones of personal computers manufactured by a variety of companies. However, as shown in FIG. 6, there is a case in which the section management tables are absent (there is no section management table for Company C).

In FIG. 6, numeral 11' the accessible area of the optical disk, 101 the area (first area) for storing common-use data (FATs, a directory, a file) capable of being accessed by personal computers manufactured by various companies, and 102 the second section storing plural items of logical format information for managing data that has been recorded in the first area.

The section management table 102a of Company A is provided at LBN 1 of the second area 102 so as to correspond to the personal computer manufactured by Company A. Position information (LBN=512) of the BPB table is entered in the section management table 102a. The BPB table 102a' contains address information (reserved sector count, sector length) ADa, which indicates the starting position (LBN=516) of the first section 101.

More specifically, the following information shown in FIG. 7A is described in the BPB table 102a':

sector size SS=2048 bytes cluster length SC=two sectors reserved sector count RS=one sector FAT count FN=2 entry count RDE of root director=1024 total sector count TS in logical volume=61816 media descriptor=FA sector count per FAT=32 sectors

When the address information (reserved sector count, sector length) is used, the starting position of the first area 101 (the starting position of the first FAT) is obtained from Equation (1). That is, FAT starting position=516 is obtained.

The section management table 102b of Company B is provided at LBN 0 of the second area 102 so as to correspond to the personal computer manufactured by Company B. Position information (LBN=515) of the BPB table is entered in the section management table 102b. The BPB table 102b' contains address information (reserved sector count, sector length) ADb, which indicates the starting position (LBN=516) of the first section 101.

More specifically, the following information shown in FIG. 7B is described in the BPB table 102b':

sector size SS=512 bytes cluster length SC=eight sectors reserved sector count RS=one sector FAT count FN=2 entry count RDE of root director=1024 total sector count TS in logical volume=247261 media descriptor=FA sector count per FAT=128 sectors

When the address information (reserved sector count, sector length) is used, the starting position of the first area 101 (the starting position of the first FAT) is obtained from Equation (1). That is, FAT starting position=516 is obtained.

The BPB table 102c' of Company C is provided at LBN 0 of the second area 102 so as to correspond to the personal computer manufactured by Company C. The BPB table 102c' contains address information ADc, which indicates the starting position (LBN=516) of the first section 101.

More specifically, the following information shown in FIG. 7C is described in the BPB table 102c':

sector size SS=512 bytes cluster length SC=eight sectors reserved sector count RS=516 sectors FAT count FN=2 entry count RDE of root director=1024 total sector count TS in logical volume=247776 media descriptor=FA sector count per FAT=128 sectors

When the address information (reserved sector count, sector length) is used, the starting position of the first area 101 (the starting position of the first FAT) is obtained from Equation (1). That is, FAT starting position=516 is obtained.

It should be noted that since the items of information of Companies B and C at LBN 0 are provided at positions which do not overlap each other, the items of information of Companies B and C can coexist at LBN 0. For example, the personal computer manufactured by Company C deems that the BPB table has been recorded at 0-th to m-th bytes of LBN 0 and reads the BPB table starting from this position. The personal computer manufactured by Company B deems that the section management table has been stored following the n-th byte (n>m) and reads the section management table starting from this position.

The personal computers manufactured by Companies A and B are capable of performing file access in the same manner as in the case of FIG. 4. As for the personal computer manufactured by Company C, the host system recognizes that the BPB table resides at LBN 0 when the optical disk is inserted into the optical disk drive of the personal computer manufactured by Company C. Accordingly, the BPB table 102c' is read from LBN 0. Next, the host system recognizes that the first section 101 starts from LBN 516 based upon the address information ADc contained in the BPB table 102c'. Thereafter, the host system reads the file designated using the FAT information and directory information from the first area or writes the designated file in the first area.

(d) Second embodiment of optical disk (d-1) Constitution

Figure 8:
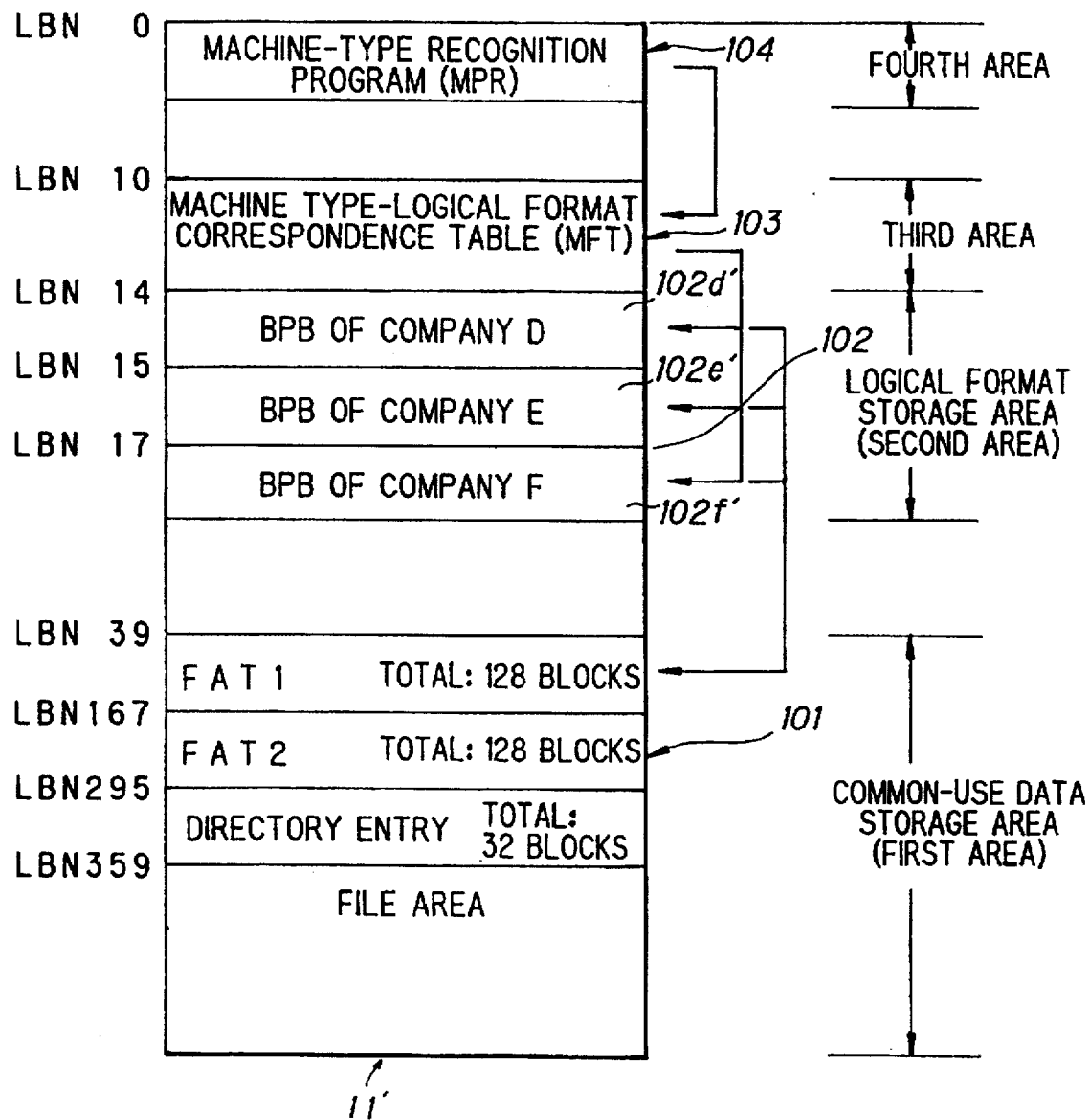
FIG. 8 is a diagram showing the constitution of an optical disk according to a second embodiment of the present invention.

FIG. 8 is a diagram showing a second embodiment of the constitution of an accessible area in the optical disk, which is an interchangeable recording medium. In this embodiment, only a computer device (or devices) registered in a correspondence table (described later) giving the correspondence between machine type and logical format is capable of utilizing an optical disk.

Numeral 11' denotes the accessible area of the optical disk, 101 the area (first area) for storing common-use data (FATs, a directory, a file) capable of being accessed by personal computers manufactured by various companies, 102 the second section storing plural items of logical format information for managing data that has been recorded in the first area, 103 the third area for recording a correspondence table MFT giving the correspondence between machine type and logical format, and 104 the fourth area storing a machine-type recognition program MPR for recognizing the machine type of a computer device.

The first and second FAT entries, the directory entry and the file area are provided in the first area 101, so that the first area 101 stores the FAT information, directory information and various files.

A BPB table 102d is stored at LBN 14 of the second area 102 so as to correspond to a personal computer manufactured by Company D. The following information shown in FIG. 9A is described in the BPB table 102d of Company D:

sector size SS=512 bytes cluster length SC=eight sectors reserved sector count RS=25 sectors FAT count FN=2 entry count RDE of root director=1024 total sector count TS in logical volume=246304 media descriptor=FA sector count per FAT=128 sectors

A BPB table 102e' is stored at LBN 15 of the second area 102 so as to correspond to a personal computer manufactured by Company E. The following information shown in FIG. 9B is described in the BPB table 102e' of Company E:

sector size SS=2048 bytes cluster length SC=two sectors reserved sector count RS=six sectors FAT count FN=2 entry count RDE of root director=1024 total sector count TS in logical volume=61576 media descriptor=FA sector count per FAT=32 sectors

A BPB table 102f is stored at LBN 17 of the second area 102 so as to correspond to a personal computer manufactured by Company F. The following information shown in FIG. 9C is described in the BPB table 102f of Company F:

sector size SS=512 bytes cluster length SC=eight sectors reserved sector count RS=22 sectors FAT count FN=2 entry count RDE of root director=1024 total sector count TS in logical volume=246304 media descriptor=FA sector count per FAT=128 sectors

As shown in FIG. 10, logical format names and storage locations of BPB tables are correlated with the names of machine types of personal computers in the correspondence table MFT, stored in the third area 103, giving the correspondence between machine types and logical formats. The correspondence table MFT shows that the BPB table 102d of Company D has been stored at LBN 14, that the BPB table 102e' of Company E has been stored at LBN 15, and that the BPB table 102f of Company F has been stored at LBN 17.

The machine-type recognition program MPR for recognizing the machine type of a computer device is stored in the fourth area 104. When the optical disk is inserted in the disk drive, the host system reads the machine-type recognition program MPR automatically and runs the program. The machine-type recognition program MPR reads the machine-type information (e.g., Fujitsu FMR80, NEC PC9801, etc.) indicative of the personal computer, which information has been stored in an internal ROM of the personal computer, and then identifies the position of the BPB table conforming to the machine type of the personal computer. The identification is made based upon the correspondence table MFT. It should be noted that machine-type information for identifying the type of machine is always stored in the ROMs of all personal computers.

(d-2) Comparison of logical formats of various companies

When reference is made to BPB tables 102d, 102e', 102f of the respective companies in FIGS. 9A–9C, the starting positions of the FATs of respective companies agree as follows since the starting position is obtained, in accordance with Equation (1), by adding the reserved sectors to the LBN at which the BPB table resides:

FAT starting position of Company D: LBN (14+25.1)= LBN 39

FAT starting position of Company E: LBN (15+6.4)=LBN 39

FAT starting position of Company F: LBN (17+22.1)= LBN 39

It should be noted that the reason for multiplying the reserved sector count by 4 when the FAT starting position of Company E is calculated is that the sector size of Company E is four times the sector size of Companies D and F.

Figure 22:
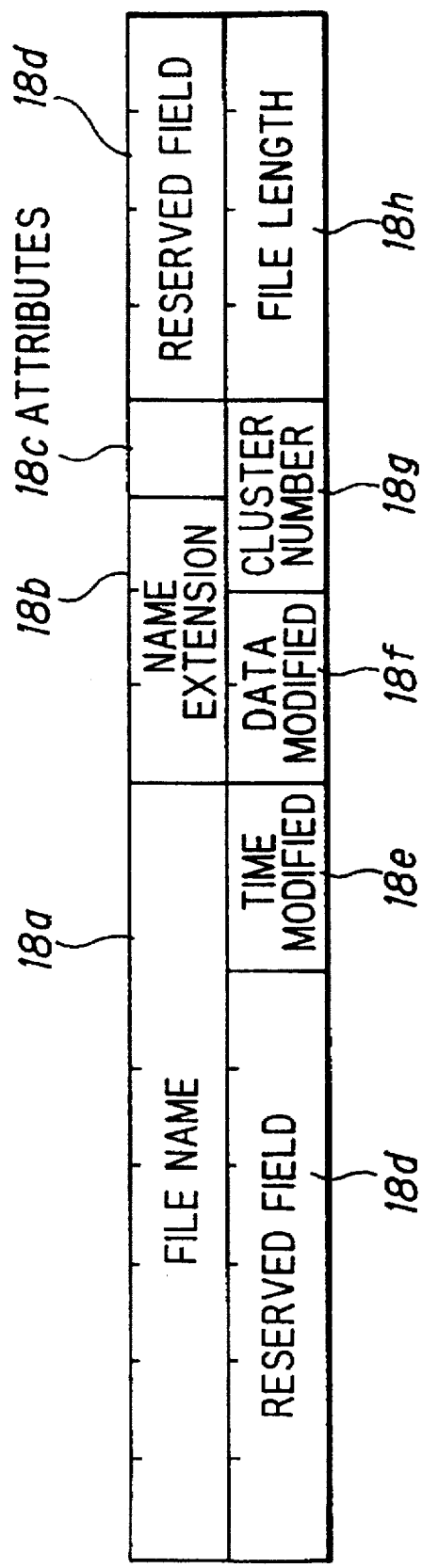
FIG. 22 is a diagram for describing the structure of a directory.
Figure 23:
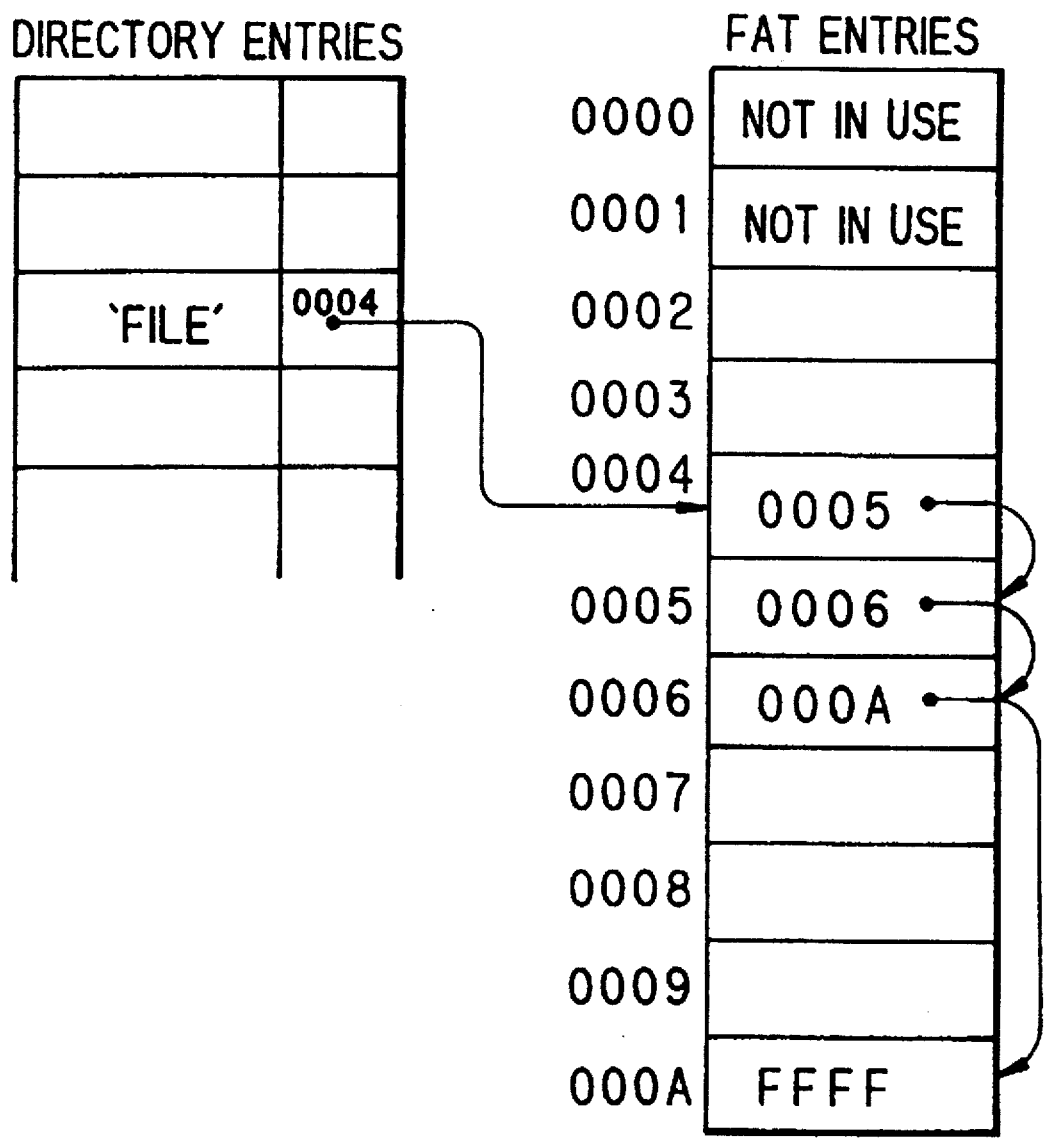
FIG. 23 is a diagram for describing file management.
Figure 24:
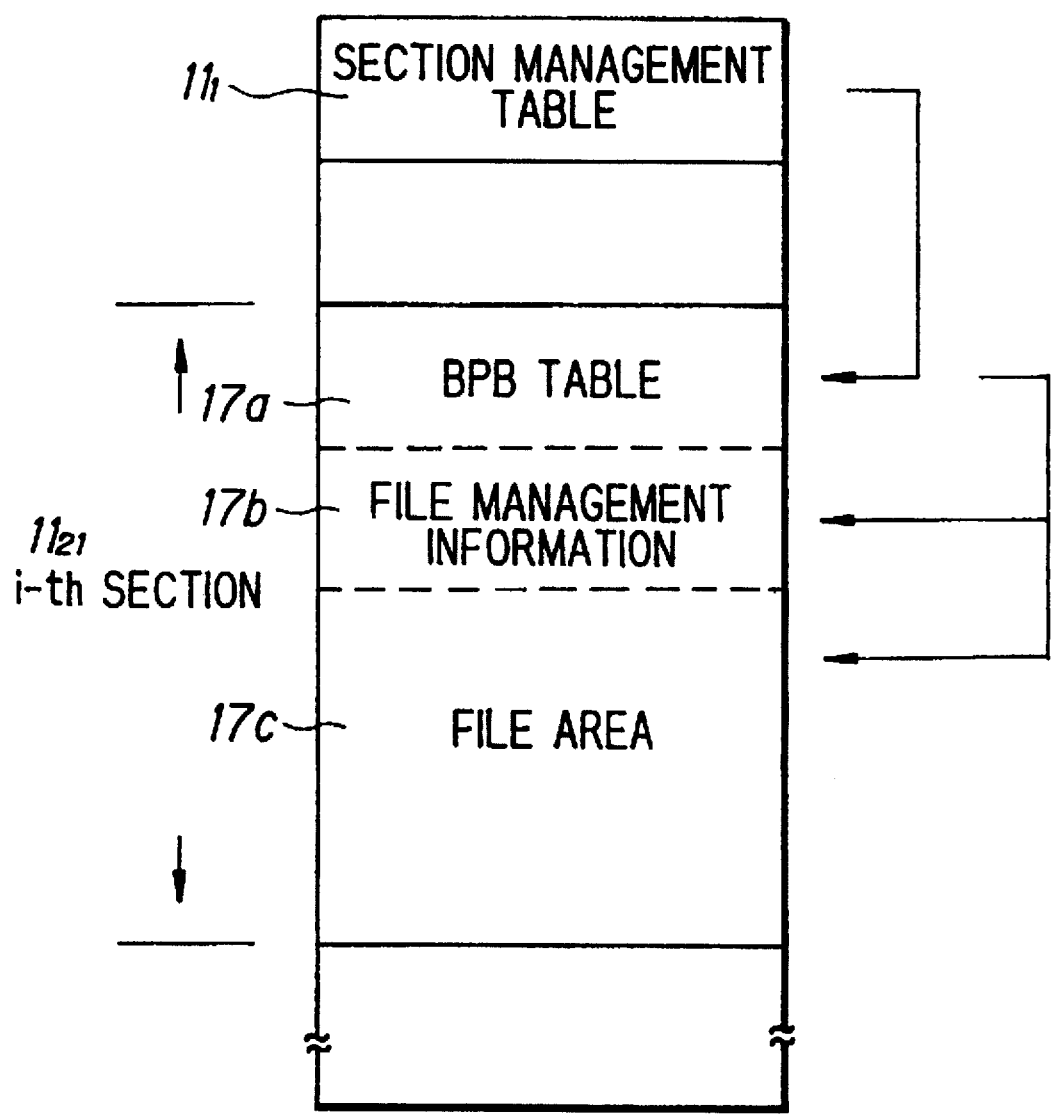
FIG. 24 is a diagram for describing file access in a personal computer using an optical disk as a recording medium.
Figure 25A:
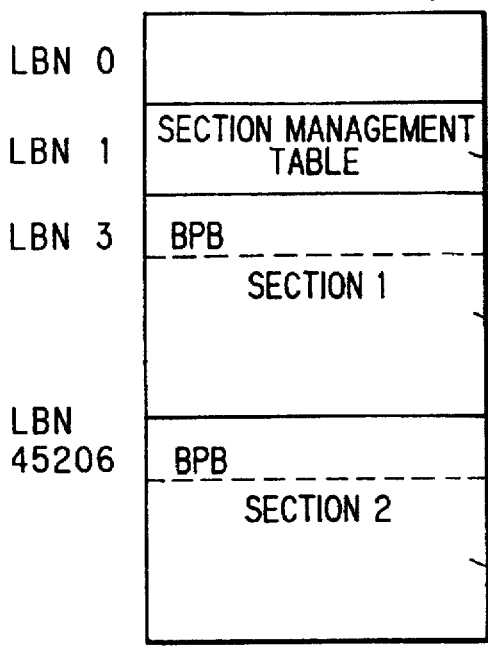
FIGS. 25A, 25B and 25C are diagrams for describing the logical formats of various companies.
Figure 25B:
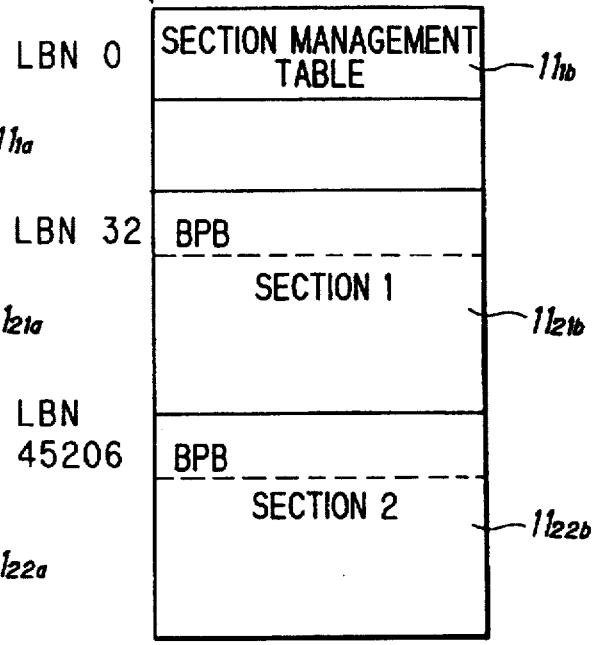
Figure 25C:
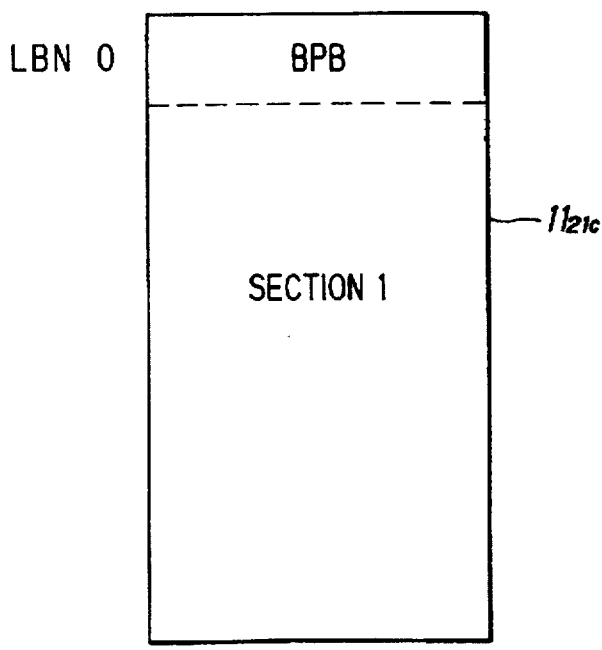

Further, the sizes of the FAT entry portions and the sizes of the root directory entries also agree as shown below when they are calculated in terms of a sector (=512 bytes). It should be noted that the size of one root directory entry is 32 bytes, as described in connection with FIG. 22.

① Sizes of FAT entry portions

Size of FAT of Company D: 128.1=128 blocks

Size of FAT of Company E: 32.4=128 blocks

Size of FAT of Company F: 128.1=128 blocks

② Sizes of root directory entry portions

Size of root directory entry portion of Company D: 1024.32 (bytes)/512 (byte/sector)=64 blocks Size of root directory entry portion of Company E: 1024.32 (bytes)/512 (byte/sector)=64 blocks Size of root directory entry portion of Company F: 1024.32 (bytes)/512 (byte/sector)=64 blocks Furthermore, the FAT starting positions, root directory starting positions and file area starting positions in the logical formats of the various companies agree, as shown in FIG. 11. Accordingly, the starting position of a root directory entry portion is a value obtained by adding the size of a FAT (there are two, or first and second, FATs) to the FAT starting position, and the starting position of a file area is a value obtained by adding the size of a root directory entry portion to the starting position of the root directory entry portion.

On the basis of the foregoing, the personal computers manufactured by Companies D, E, F are capable of pointing commonly to the FATs, root directory entries and file areas using the logical formats of these companies. More specifically, in accordance with the logical format of each company, the personal computer of each company is capable of making common use of the first and second FATs registered from LBN 39, LBN 167 onward and common use of the root directory registered from LBN 295 onward. As a results, it is possible for these personal computers to access the file area from LBN 359 onward in similar fashion so as to read or write a file.

(d-3) File access control

Figure 12:
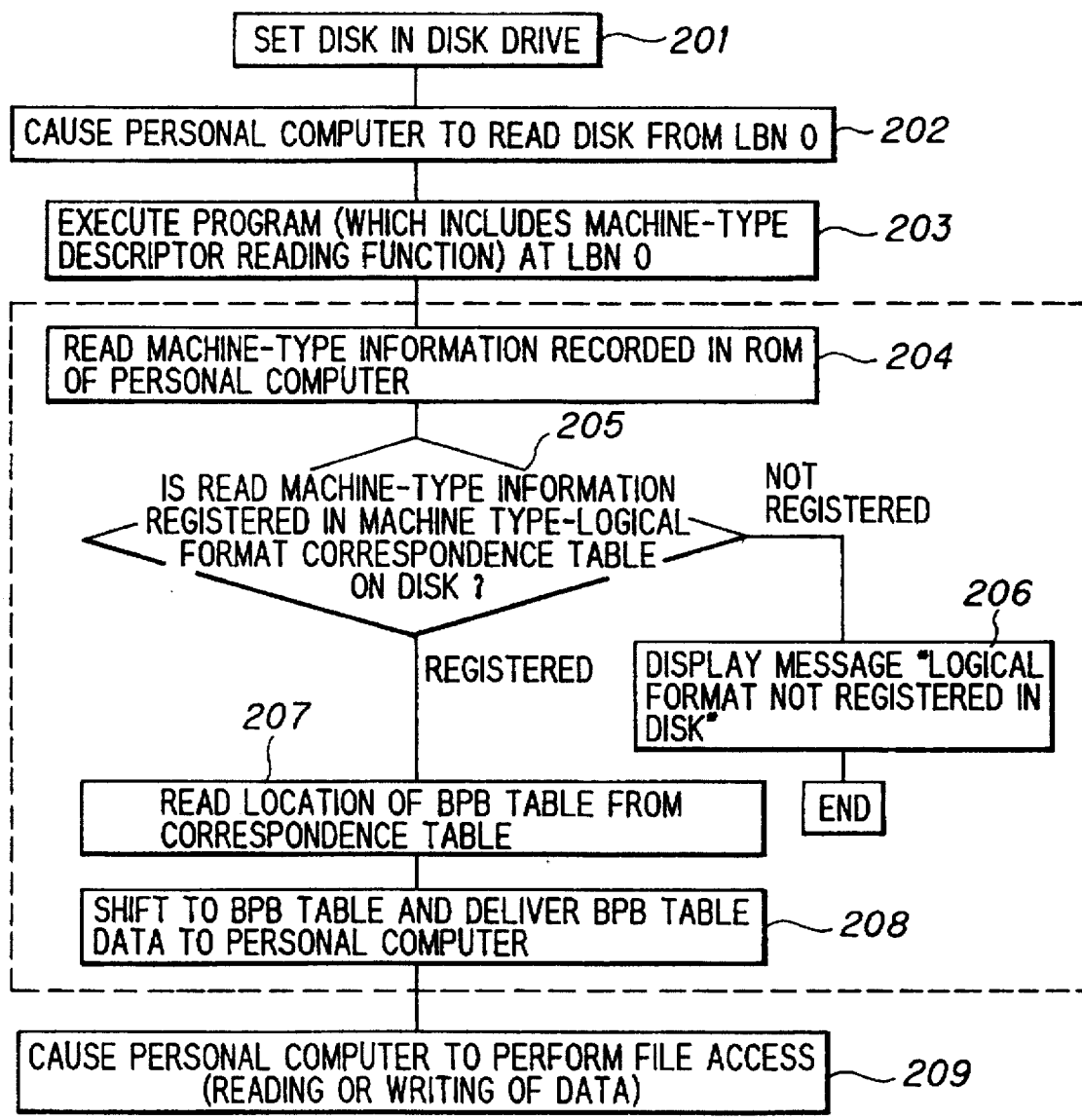
FIG. 12 is a flowchart of processing executed when a file is accessed.

FIG. 12 is a flowchart of processing executed at the time of disk access. The steps enclosed by the dashed line represent processing executed by the machine-type recognition program MPR.

When the optical disk is inserted in the optical disk drive 21 (FIGS. 2, 3) of a personal computer, the processor 31a of the host system 31 reads the machine-type recognition program MPR from LBN 0 and stores the program in the main memory 31b (step 202). The processor then executes machine-type recognition program MPR (step 203).

On the basis of the program MPR, the processor reads the machine-type information of the personal computer stored in the ROM (not shown) of the personal computer (step 204) and then refers to the correspondence table MFT, which gives the correspondence between the machine type and the logical format and is stored at LBN 10, to determine whether the name of the read machine type has been registered in the table (step 205).

If the name of the read machine type has not been registered, the computer causes the display unit 51 to display a message reading "LOGICAL FORMAT NOT REGISTERED IN DISK" (step 206), processing is terminated and the computer waits for insertion of another optical disk.

If the name of the machine has been registered in the correspondence table MFT, on the other hand, the position of the BPB table is read from the table MFT (step 207). For example, LBN 14 is read as the position of the BPB table 102d in the case of the personal computer manufactured by Company D; LBN 15 is read as the position of the BPB table 102e' in the case of the personal computer manufactured by Company E; and LBN 17 is read as the position of the BPB table 102f in the case of the personal computer manufactured by Company F.

Thereafter, the prescribed BPB table is read (step 208). This is followed by reading or writing the designated file upon accessing the file area using the above-mentioned BPB table as well as the FAT and root directory entry that have been recorded in the first area 101 (step 209).

If the arrangement described above is adopted, one and the same optical disk can be shared by a plurality of personal computers registered in the correspondence table MFT. Moreover, data registered in the optical disk can be utilized commonly by these personal computers.

Figure 13:
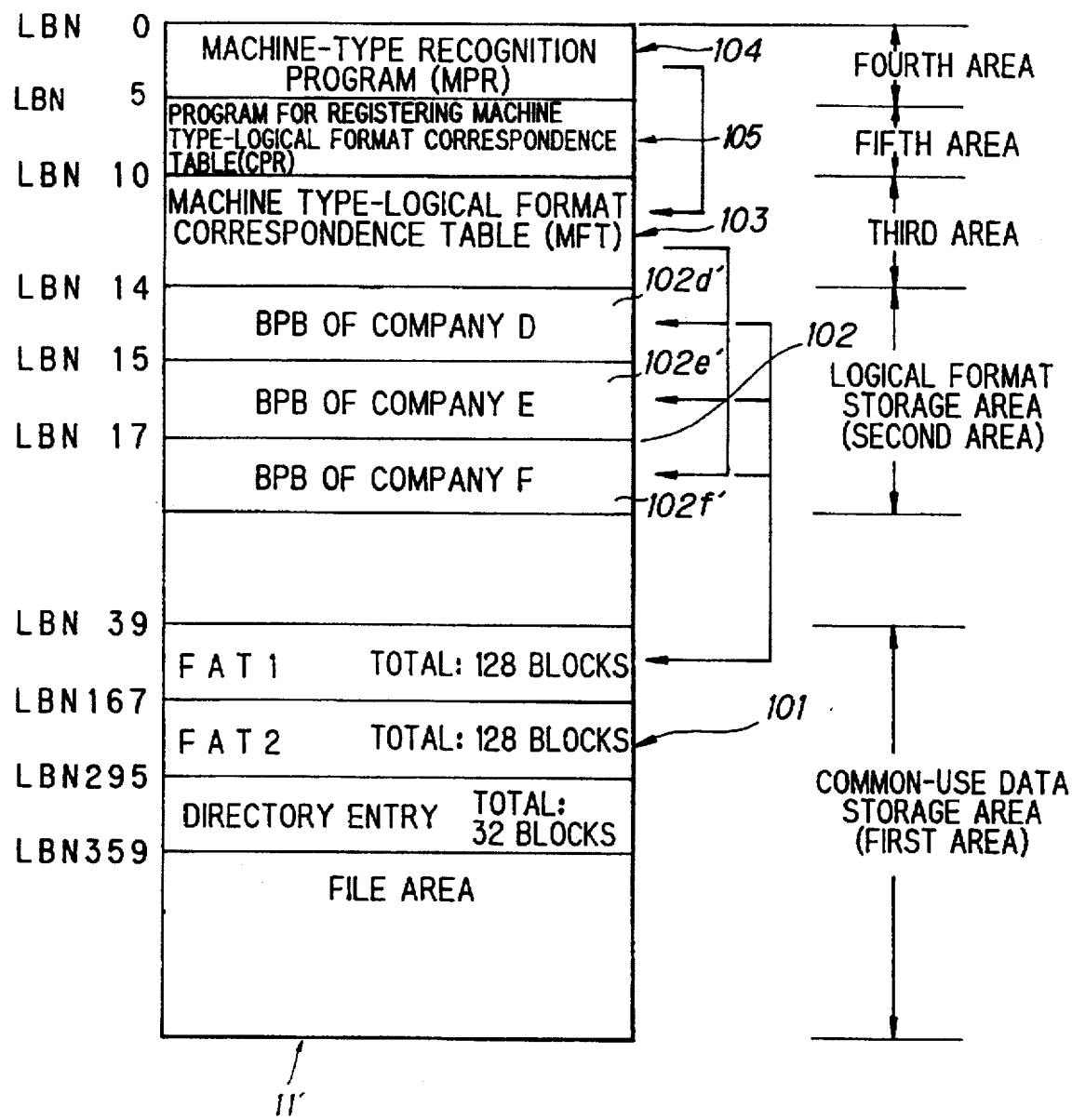
FIG. 13 is a diagram showing the constitution of an optical disk having a registration function.

In the case where the name of the machine type is found not to be registered in the correspondence table MFT, the prescribed message is displayed (step 206) and file access processing is then terminated. However, an arrangement can be adopted in which processing for registering the machine type is executed. In such case, a program CPR for registering the correspondence table indicating the correspondence between machine type and logical format is recorded in a fifth area 105 of the interchangeable recording medium, as shown in FIG. 13.

Figure 14:
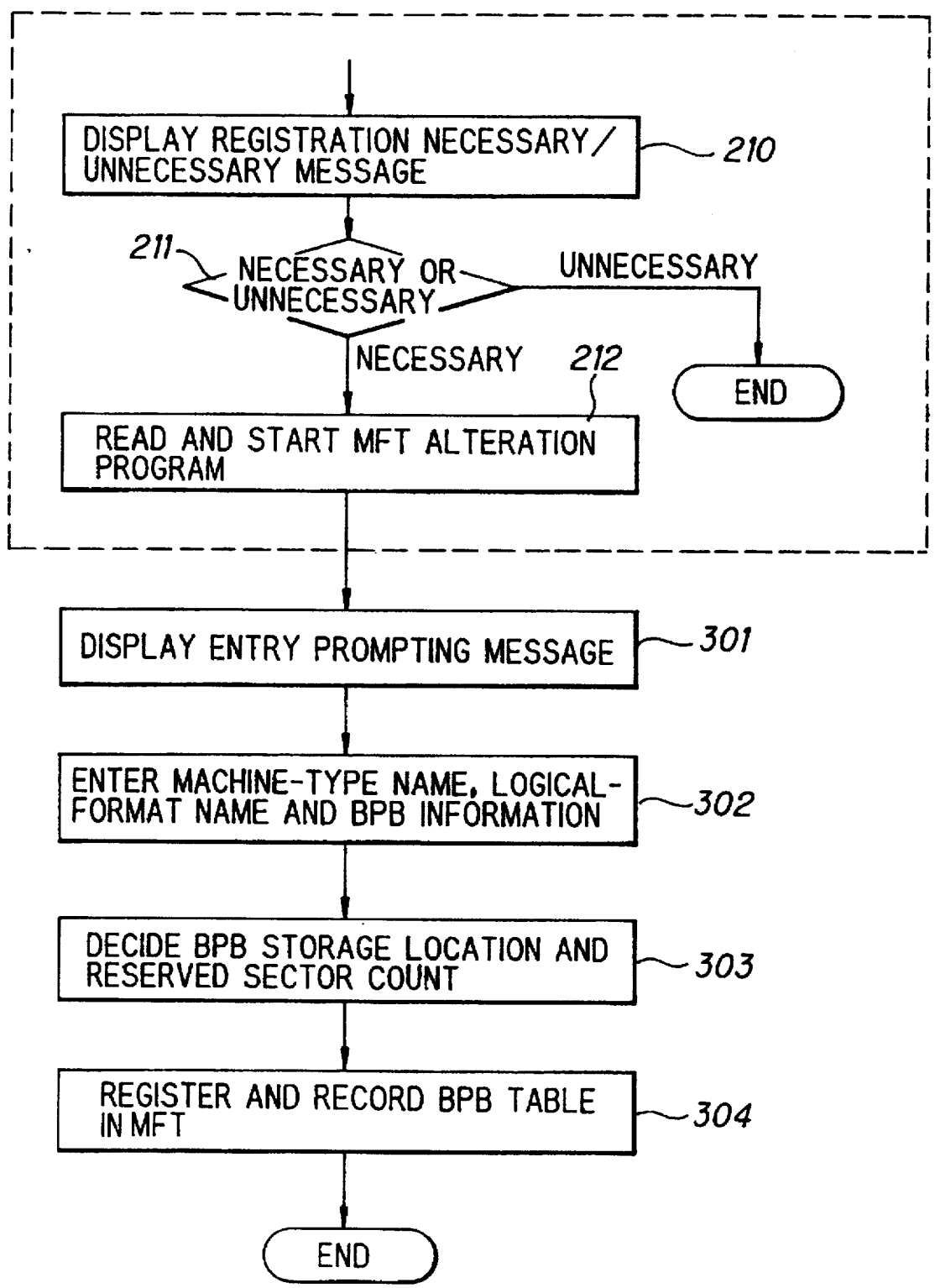
FIG. 14 is a flowchart of registration processing.

FIG. 14 is a flowchart of registration processing based upon the registration program CPR. The steps enclosed by the dashed line represent the processing executed by the machine-type recognition program MPR.

A message inquiring whether machine type is to be registered after step 206 of FIG. 12 is displayed on the display unit 51 (step 210). If the fact that registration is unnecessary is entered in response to this message, file access processing is terminated (step 211). If the fact that registration is necessary is entered, however, the registration program CPU is read from the optical disk and the registration program is started (step 212).

Thereafter, the processor 31a causes entry prompting messages to be displayed successively on the display unit 51 based upon the registration program CPR (step 301). In accordance with the messages, the user enters the name of the machine type (the personal computer manufactured by Company G), the name of logical format and the BPB information (step 302). It should be noted that the reserved sector count is decided on the system side.

Next, on the basis of the logical format information of Company G, the position at which the BPB table is stored and the reserved sector count are decided so as to obtain the starting position (LBN 39) of the FAT entries, the starting position (LBN 295) of the directory entry and the starting position (LBN 359) of the file area (step 303).

When the position at which the BPB table is stored and the reserved sector count have been determined, the processor adds newly the correspondence among the name of the machine type, the name of the logical format and the position of the BPB table of Company G to the correspondence table MFT, stores the BPB table of Company G at the storage location of the BPB table (step 304) and terminates registration processing. As a result, the personal computer of Company G is capable of utilizing the optical disk.

(d-4) Modifications

① First Modification

The foregoing relates to a case in which only the BPB table is registered as the logical format information. However, an arrangement can be adopted in which both a section management table and BPB table are recorded as logical format information.

Figure 15:
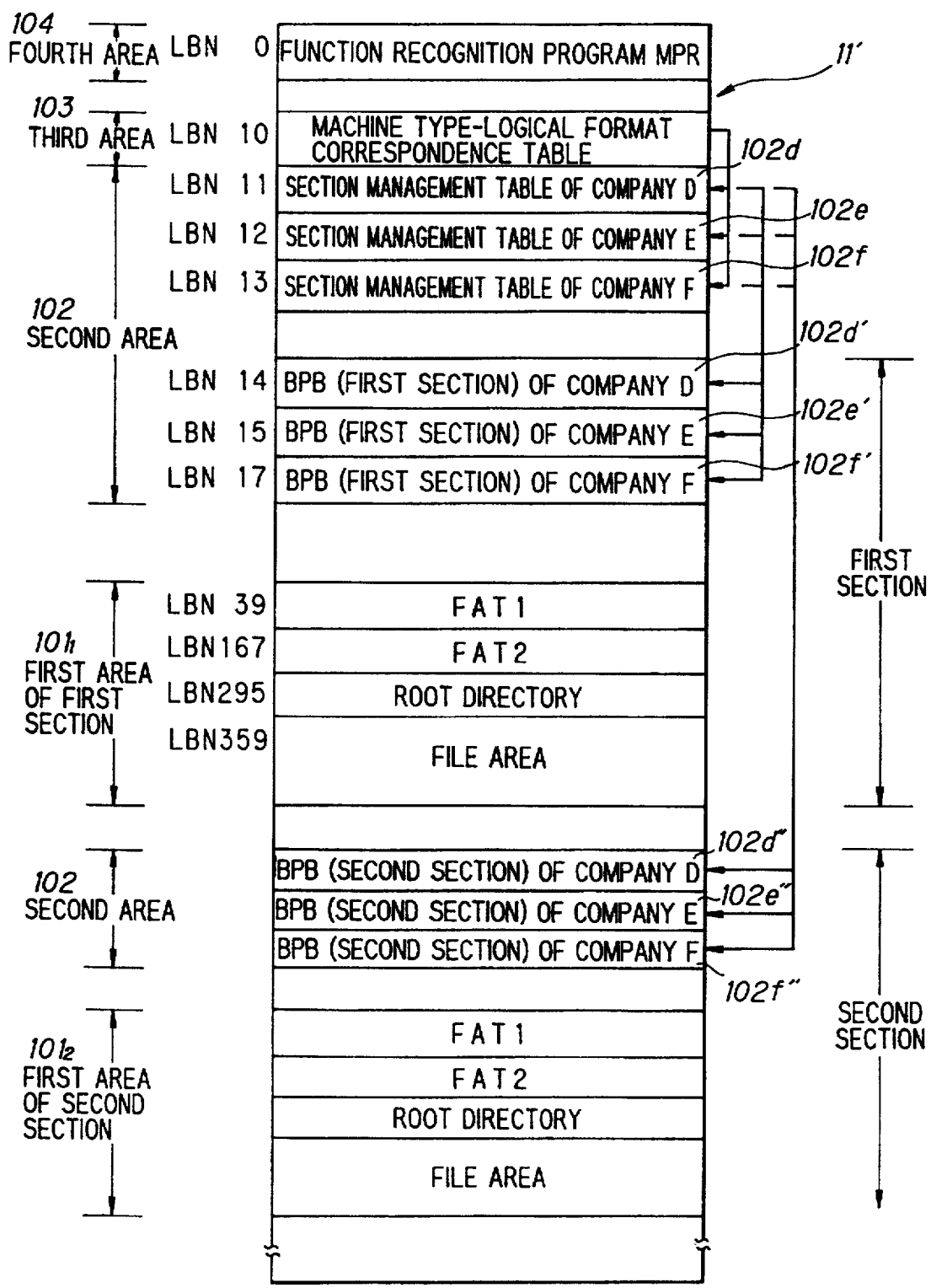
FIG. 15 is a diagram for describing a modification of the second embodiment according to the invention.
Figure 17A:
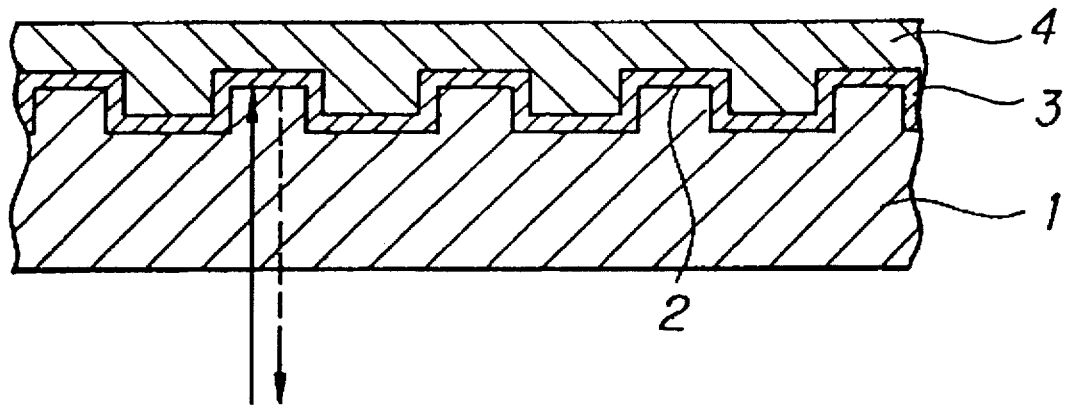
FIGS. 17A, 17B are diagrams for describing a ROM disk.
Figure 17B:
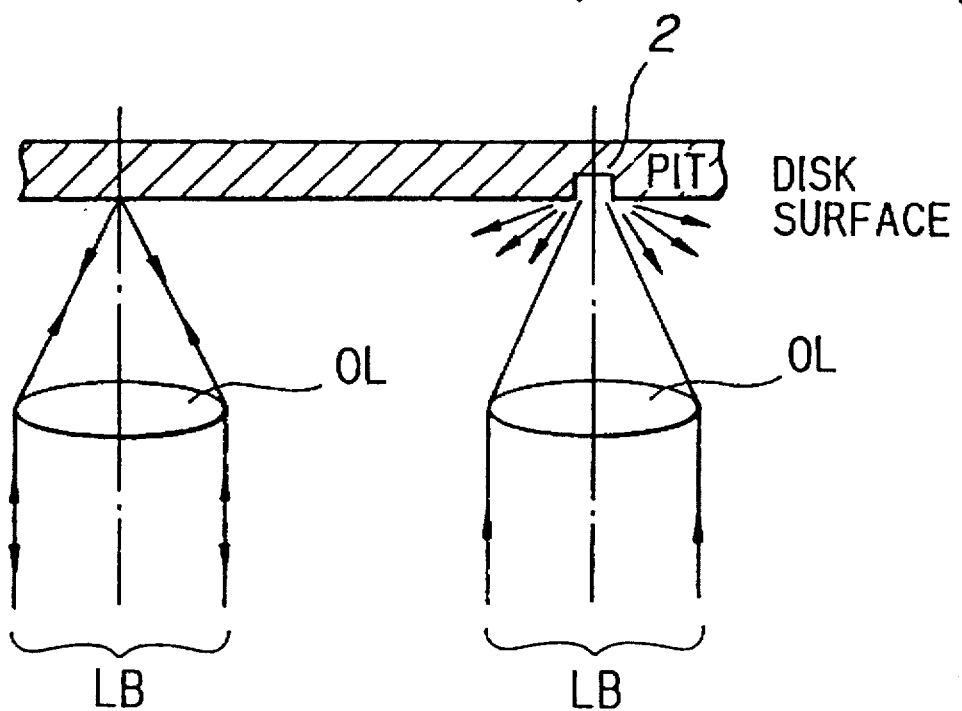
Figure 18A:
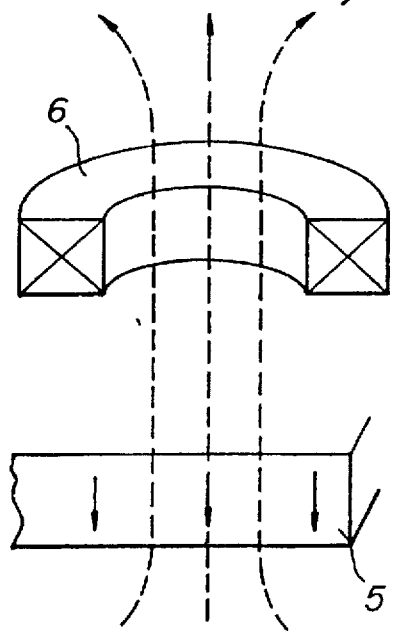
FIGS. 18A, 18B and 18C are diagrams for describing writing/reading of a magneto-optical disk.
Figure 18B:
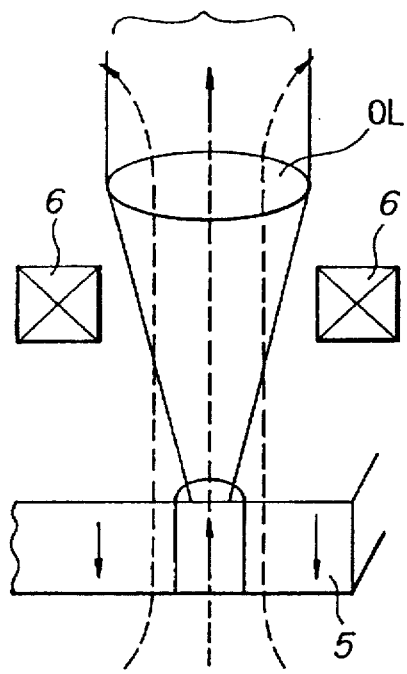
Figure 18C:
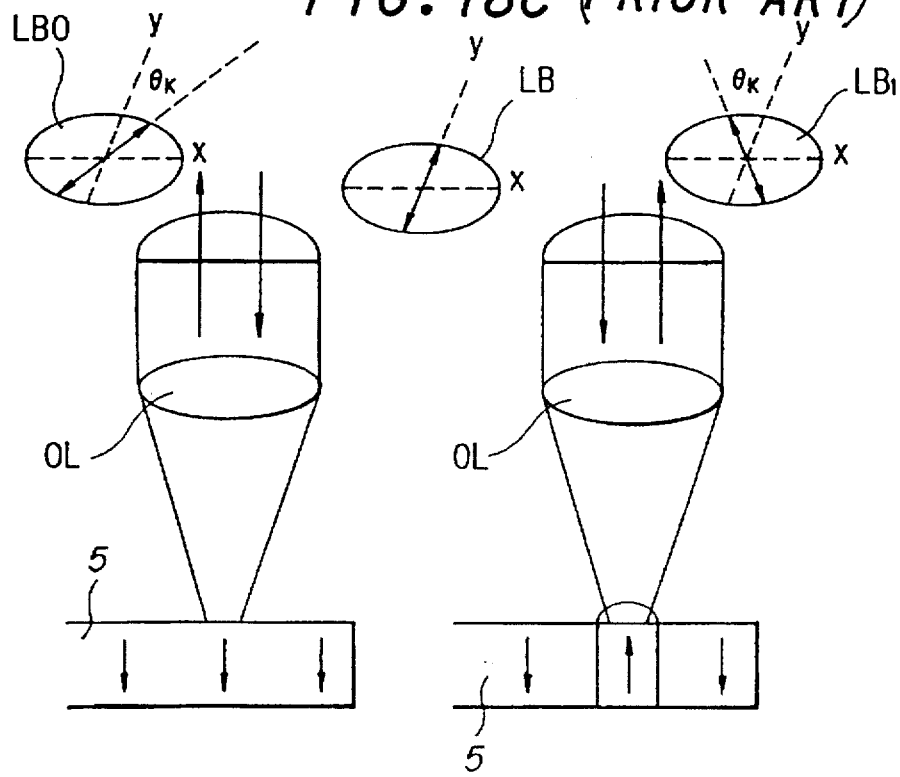

FIG. 15 is a diagram showing the construction of an optical disk in a case where both a section management table and BPB table are recorded on an optical disk as logical format information. Here the optical disk has a plurality of sections (first section, second section, . . . ).

Numeral 11' denotes the accessible area of the optical disk, $101_1$, $101_2$ . . . first areas for storing common-use data (FATs, a directory, a file) of a first section, second section, . . . , respectively, 102 the second section storing logical format information for managing data that has been recorded in the first areas $101_1$, $101_2$ . . . , 103 the third area for recording a correspondence table MFT giving the correspondence between machine type and logical format, and 104 the fourth area storing a machine-type recognition program MPR for recognizing the machine type of a computer device.

Figure 20:
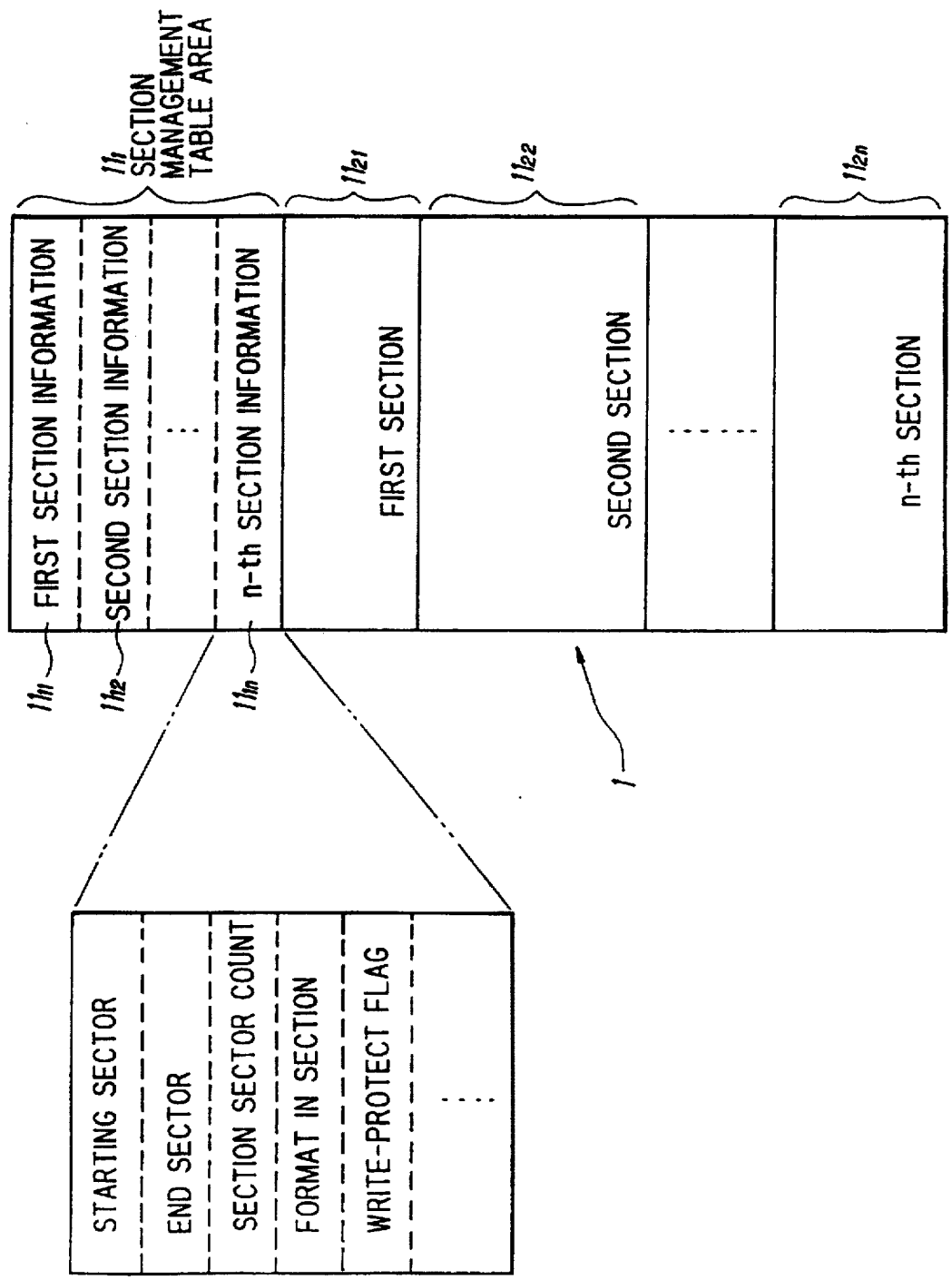
FIG. 20 is a diagram showing the constitution of an accessible area.
Figure 21:
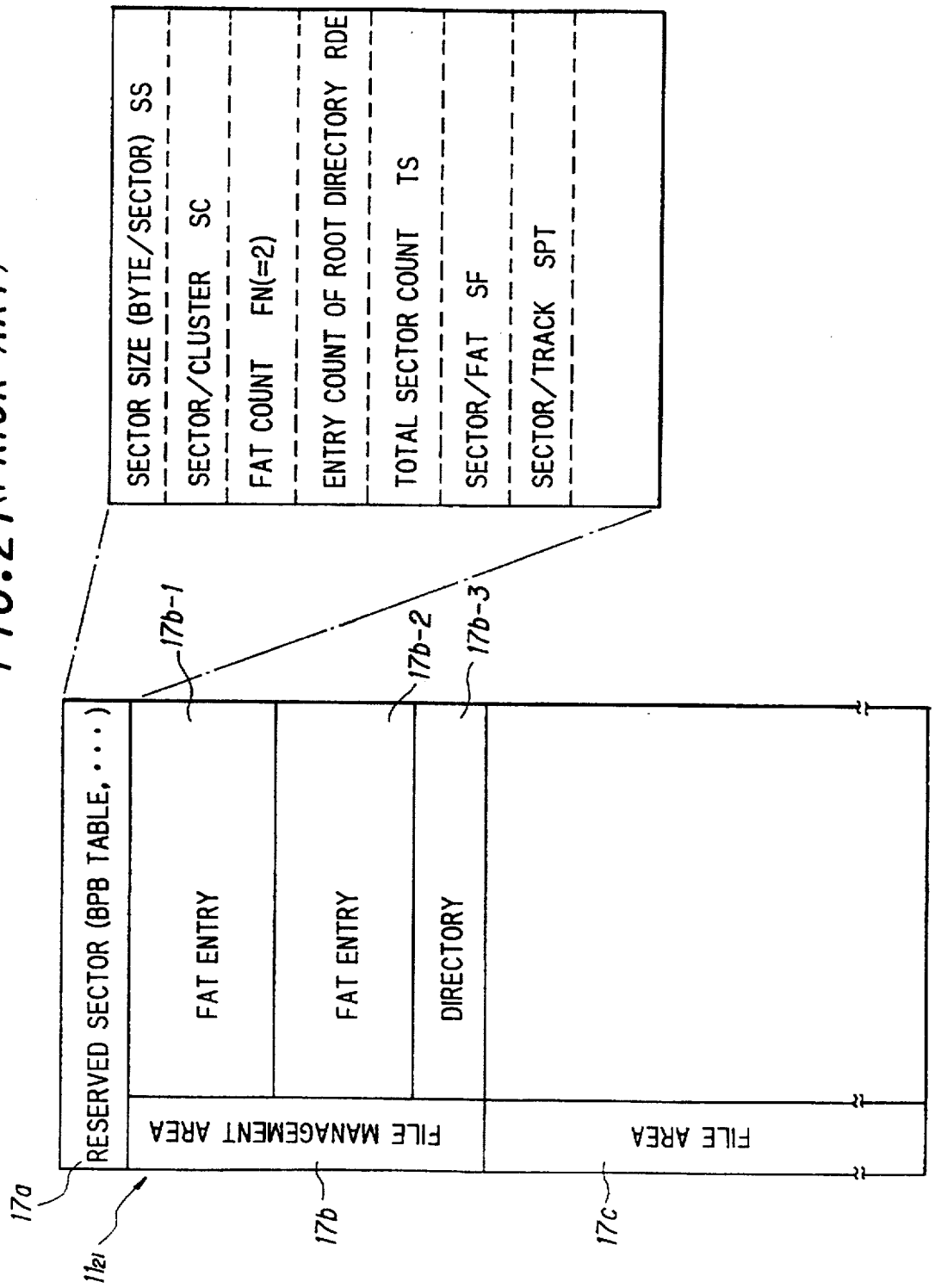
FIG. 21 is a diagram for describing the structure of a section.

The first areas $101_1$, $101_2$ . . . are provided with FAT entries (FAT 1, FAT 2), a directory entry and file area of the first section, second section, . . . , respectively, and store first and second FAT information, directory information and various files. Section management tables 102d, 102e, 102f of the respective companies, and first and second BPB tables 102d', 102e', 102f; 102d", 102e", 102f" of the respective companies are stored in the second area 102. The starting sector (the position of the BPB table) of each section is provided in the section management tables 102d-102f, as shown in FIG. 20. The BPB tables 102d'-102f', 102d"-102f" of the first and second sections are provided at the beginning of the first and second sections. It should be noted that the contents of the BPB tables 102d'-102f' of the first section are the same as shown in FIG. 9.

A correspondence table MFT' showing the correspondence between machine type and logical format is stored in the third area 103. As shown in FIG. 16, logical format names and storage locations of section management tables are correlated with the names of machine types of personal computers in the correspondence table MFT'. The correspondence table MFT' shows that the section management table 102d of Company D has been stored at LBN 11, that the section management table 102e of Company E has been stored at LBN 12, and that the section management table 102f of Company F has been stored at LBN 13.

When the optical disk is inserted in the optical disk drive 21 (FIGS. 2, 3) of the personal computer, the processor 31a of the host system reads the machine-type recognition program MPR automatically from LBN 0 and stores the program in the main memory 31b. The processor then runs the program MPR. On the basis of the machine-type recognition program MPR, the processor reads the machine-type information of the personal computer stored in the ROM of the personal computer and then refers to the correspondence table MFT' recorded at LBN 10 to determine whether the name of the machine type read has been registered in this table. If the name of the machine type has not been registered, a message reading "LOGICAL FORMAT NOT REGISTERED IN DISK" is displayed on the display unit 51, processing is ended and the computer waits for insertion of another optical disk.

If the name of the machine has been registered in the correspondence table MFT', on the other hand, the position of the section management table is read from the table MFT'. Thereafter, the position of the BPB table of the first section is read from the section management table. This is followed by reading or writing the designated file upon accessing the file area using the above-mentioned BPB table as well as the FAT and root directory entry that have been recorded in the first area 101.

② Second Modification

The foregoing relates to a case in which a machine-type recognition program is stored in an optical disk and the program is executed to identify the machine type of a personal computer. However, in a case where the personal computer itself has a function for identifying machine type, the recognition program need not be recorded on the optical disk.

③ Third Modification

In the foregoing a case is described in which the invention is applied to an optical disk. However, application of the invention is not limited to optical disks; the invention is applicable to all portable, interchangeable storage media such as IC memories, floppy disks, etc.

In accordance with the present invention, it is so arranged that plural types of logical format information for managing common-use data (FATs, directories, files) are recorded on an interchangeable recording medium. Accordingly, each of a variety of computer devices is capable of reading logical format information conforming to its own machine type, after which the computer can access the common-use data based upon the logical format read. As a result, one and the same interchangeable recording medium can be shared by plural types of computer devices, and the common-use data that has been recorded on the interchangeable recording medium can be utilized by plural types of computer devices in common.

Further, in accordance with the present invention, plural types of logical format information for managing common-use data (FATs, directories, files) are recorded on an interchangeable recording medium, and the corresponding relationship between the type of a computer device and the position at which logical format information is stored also is recorded on the interchangeable recording medium. Accordingly, each computer device refers to the corresponding relationships to identify the position at which its own logical format information has been stored, reads the logical format information from this position and is capable of accessing the common-use data based upon the logical format read. As a result, one and the same interchangeable recording medium can be shared by plural types of computer devices, and the common-use data that has been recorded on the interchangeable recording medium can be utilized by plural types of computer devices in common.

As many apparently widely different embodiments of the present invention can be made without departing from the spirit and scope thereof, it is to be understood that the invention is not limited to the specific embodiments thereof except as defined in the appended claims.

What is claimed is:

1. A multiple format interchangeable optical recording medium comprising:
   a first area for storing file management data accessible by a plurality of types of computers; and
   a second area for storing a plurality of types of computer logical format information corresponding to said plurality of types of computers, for managing the file management data recorded in said first area.

2. The multiple format interchangeable optical recording medium according to claim 1, wherein said computer logical format information includes address information necessary to access the file management data stored in said first area.

3. A method of accessing data of a multiple format interchangeable optical recording medium storing file management data accessible by a plurality of types of computers, and computer logical format information corresponding to said plurality of types of computers for managing the file management data, wherein a corresponding relationship between each of said of plurality of types of computers and storage locations of the computer logical format information is stored upon the recording medium, said method comprising:
   recognizing a location at which computer format information corresponding to the computer into which the recording medium has been loaded has been stored, by referring to said corresponding relationship;
   reading the logical format information from said location; and
   accessing data in the recording medium based upon the computer logical format information that has been read during said step of reading.

4. A multiple format interchangeable optical recording medium comprising:
   a first area for storing file management data accessible by a plurality of types of computers;
   a second area for storing a plurality of types of computer logical format information for managing selected file management data recorded in said first area;
   a third area for storing storage locations of said computer logical format information for each of said plurality of types of computers.

5. The multiple format interchangeable optical recording medium according to claim 4, further comprising a fourth area for storing a machine-type recognition information for identifying machine type of a computer.

6. A method of accessing data of a multiple format interchangeable optical recording medium storing file management data accessible by a plurality of types of computers, and computer logical format information corresponding to said plurality of types of computers for managing the file management data, said computer logical format information being recorded at a location that conforms to each of said plurality of types of computers, and includes address information to access selected file management data, said method comprising:
   reading computer logical format information corresponding to a computer type into which the recording medium has been loaded; and accessing data in the recording medium based upon the computer logical format information that has been read during said step of reading.

7. A method according to claim 6, wherein computer logical format information corresponding to each of said plurality of computers is recorded at a location that conforms to each of said plurality of types of computers, and the computer in which the interchangeable recording medium has been loaded reads logical format information from a location conforming to the computer into which the recording medium has been loaded.

8. A method of accessing data of a multiple format interchangeable recording medium storing file management information data accessible by a plurality of types of computers, and computer logical format information corresponding to said plurality of types of computers for managing the file management data, wherein a corresponding relationship between each of said of plurality of types of computers and storage locations of the computer logical format information is stored upon the recording medium, said method comprising:

recognizing a location at which computer format information corresponding to the computer into which the recording medium has been loaded has been stored, by referring to said corresponding relationship;

reading the logical format information from said location;

accessing data in the recording medium based upon the computer logical format information that has been read during said step of reading.

9. A method of accessing data of a multiple format interchangeable recording medium storing file management data accessible by a plurality of types of computers, and computer logical format information corresponding to said plurality of types of computers for managing the file management data, wherein computer logical format information corresponding to each of the plurality of types of computers is recorded at a location that conforms to each of the plurality of types of computers, and includes address information to access selected file management data, said method comprising:

reading computer logical format information corresponding to a computer type into which the recording medium has been loaded; and accessing data in the recording medium based upon the computer logical format information that has been read during said step of reading.

10. A method according to claim 9, wherein computer logical format information corresponding to each of said plurality of types of computers is recorded at a location that conforms to each of said plurality of types of computers, and the computer in which the interchangeable recording medium has been loaded reads logical format information from a location conforming to the computer into which the recording medium has been loaded.

11. A method according to claim 9, wherein a corresponding relationship between each of said plurality of types of computers and storage locations of the computer logical format information and machine-type recognition information for identifying machine type of a computer into which the recording medium is loaded are respectively stored in the interchangeable recording medium, said reading step further comprising the substeps of:

identifying a machine type of the computer into which the recording medium has been loaded by reading said machine-type recognition information;

obtaining, from said corresponding relationship, a location at which the computer logical format information corresponding to the identified machine type has been recorded; and reading the computer logical format information from said location.

12. A multiple format interchangeable recording medium comprising:

a first area for storing file management data accessible by a plurality of types of computers; and a second area for storing a plurality of types of computer logical format information corresponding to said plurality of types of computers, for managing the file management data recorded in said first area.

13. The multiple format interchangeable recording medium according to claim 12, wherein said computer logical format information includes address information necessary to access the data stored in said first area.

14. A multiple format interchangeable recording medium comprising:

a first area for storing file management data accessible by a plurality of types of computers;

a second area for storing a plurality of types of computer logical format information for managing selected file management data recorded in said first area;

a third area for storing storage locations of said computer logical format information for each of said plurality of types of computers.

15. The multiple format interchangeable recording medium according to claim 14, further comprising a fourth area for storing a machine-type recognition information for identifying machine type of a computer.

16. A method of accessing data of a multiple format interchangeable optical recording medium storing file management data accessible by a plurality of types of computers, computer logical format information corresponding to said plurality of types of computers for managing the file management data, and machine-type recognition information for identifying a machine type of a computer into which the recording medium is loaded are respectively stored in the interchangeable recording medium, said method comprising:

identifying a machine type of the computer into which the recording medium has been loaded by reading said machine-type recognition information;

obtaining, from said corresponding relationship, a location at which the computer logical format information corresponding to the identified machine type has been recorded;

reading computer logical format information corresponding to a computer type into which the recording medium has been loaded from said location; and accessing data in the recording medium based upon the computer logical format information that has been read during said step of reading.

* * * * *

UNITED STATES PATENT AND TRADEMARK OFFICE
CERTIFICATE OF CORRECTION

PATENT NO. : 5,708,650
DATED : Jan. 13, 1998
INVENTOR(S) : Nakashima et al.

Page 1 of 4

It is certified that error appears in the above-identified patent and that said Letters Patent is hereby corrected as shown below:

On the Title Page:

Under "[30] Foreign Application Priority Data", delete "5-311296" and insert --5-211296--.

Column 9, line 5, begin "FAT count FN=2" on a new line.

Column 14, line 17, delete "25.1" and insert --25·1-- therefor.

UNITED STATES PATENT AND TRADEMARK OFFICE
CERTIFICATE OF CORRECTION

PATENT NO. : 5,708,650
DATED : Jan. 13, 1998
INVENTOR(S) : Nakashima et al.

It is certified that error appears in the above-identified patent and that said Letters Patent is hereby corrected as shown below:

Column 14, line 19, delete "6.4" and insert --6·4-- therefor.

Column 14, line 21, delete "22.1" and insert --22·1-- therefor.

Column 14, line 33, delete "128.1" and insert --128·1-- therefor.

Column 14, line 34, delete "32.4" and insert --32·4-- therefor.

UNITED STATES PATENT AND TRADEMARK OFFICE
CERTIFICATE OF CORRECTION

PATENT NO. : 5,708,650
DATED : Jan. 13, 1998
INVENTOR(S) : Nakashima et al.

Page 3 of 4

It is certified that error appears in the above-identified patent and that said Letters Patent is hereby corrected as shown below:

Column 14, line 35, delete "128.1" and insert --128·1-- therefor.

Column 14, line 38, delete "1024.32" and insert --1024·32-- therefor.

Column 14, line 40, delete "1024.32" and insert --1024·32-- therefor.

Column 14, line 42, delete "1024.32" and insert --1024·32-- therefor.

UNITED STATES PATENT AND TRADEMARK OFFICE
CERTIFICATE OF CORRECTION

PATENT NO. : 5,708,650
DATED : Jan. 13, 1998
INVENTOR(S) : Nakashima et al.

It is certified that error appears in the above-identified patent and that said Letters Patent is hereby corrected as shown below:

Column 19, line 6, before "computers" insert

--types of--.

Signed and Sealed this

First Day of September, 1998

BRUCE LEHMAN

Attest:

Attesting Officer

Commissioner of Patents and Trademarks